United States Patent
Kawabata et al.

(10) Patent No.: US 12,527,634 B2
(45) Date of Patent: Jan. 20, 2026

(54) SURGICAL SYSTEM AND DISPLAY METHOD

(71) Applicant: KAWASAKI JUKOGYO KABUSHIKI KAISHA, Kobe (JP)

(72) Inventors: Hideo Kawabata, Kobe (JP); Takaki Morimoto, Yokohama (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 430 days.

(21) Appl. No.: 17/580,681

(22) Filed: Jan. 21, 2022

(65) Prior Publication Data
US 2022/0233255 A1   Jul. 28, 2022

(30) Foreign Application Priority Data
Jan. 28, 2021   (JP) ................. 2021-011781

(51) Int. Cl.
*A61B 34/00*   (2016.01)
*A61B 1/00*   (2006.01)
(Continued)

(52) U.S. Cl.
CPC ............ *A61B 34/25* (2016.02); *A61B 1/0004* (2022.02); *A61B 1/0005* (2013.01);
(Continued)

(58) Field of Classification Search
CPC ... A61B 1/00149; A61B 1/0051; A61B 34/37; A61B 34/30; A61B 90/361; A61B 34/25; A61B 34/35; A61B 34/20
See application file for complete search history.

(56) References Cited

U.S. PATENT DOCUMENTS 8,418,073 B2   4/2013   Mohr et al.
8,862,268 B2   10/2014  Robinson et al.
(Continued)

FOREIGN PATENT DOCUMENTS

EP   3628207 A1   4/2020
EP   3636194 A1   4/2020
(Continued)

OTHER PUBLICATIONS

"Field of View; FOV; Field of Action; FOA." A/V A to Z: An Encyclopedic Dictionary of Media, Entertainment and Other Audiovisual Terms, by Richard W. Kroon, 1st ed., McFarland, 2014. Credo Reference, https://search.credoreference.com/articles/Qm9va0FydGljbGU6MzUw (Year: 2014).*
(Continued)

*Primary Examiner* — Alexandra L Newton
(74) *Attorney, Agent, or Firm* — METROLEX IP LAW GROUP, PLLC; Robert L. Scott, Esq.

(57) ABSTRACT

A surgical system according to an embodiment may include: manipulators respectively supporting an endoscope and surgical instruments; a remote control apparatus including a display device to display an image captured by the endoscope and operation handles to operate the surgical instruments; and a control device configured to generate a graphical user interface and display, on the display device, the graphical user interface on an image captured by the endoscope. The control device is configured to display, in response to receiving a command that enables the endoscope to move and determining that at least one of the surgical instruments is located outside a field of view of the endoscope, a mark corresponding to the surgical instrument located outside the field of view of the endoscope at a neighborhood area in a vicinity of an outer edge of a center area of the graphical user interface.

20 Claims, 19 Drawing Sheets

(51) Int. Cl.
*A61B 34/30* (2016.01)
*A61B 34/37* (2016.01)
*A61B 90/00* (2016.01)
*G16H 20/40* (2018.01)
*G16H 40/67* (2018.01)

(52) U.S. Cl.
CPC .......... *A61B 1/00149* (2013.01); *A61B 34/37* (2016.02); *G16H 20/40* (2018.01); *G16H 40/67* (2018.01); *A61B 2034/301* (2016.02); *A61B 2034/742* (2016.02); *A61B 2090/373* (2016.02)

(56) References Cited

U.S. PATENT DOCUMENTS

| | | | |
|---|---|---|---|
| 9,301,811 | B2 | 4/2016 | Goldberg et al. |
| 9,718,190 | B2 | 8/2017 | Larkin et al. |
| 10,092,344 | B2 | 10/2018 | Mohr et al. |
| 10,730,187 | B2 | 8/2020 | Larkin et al. |
| 10,773,388 | B2 | 9/2020 | Larkin et al. |
| 10,806,533 | B2 | 10/2020 | Mustufa et al. |
| 2003/0220541 | A1* | 11/2003 | Salisbury, Jr. .......... A61B 1/313 600/101 |
| 2008/0004603 | A1* | 1/2008 | Larkin .................. A61B 34/25 606/1 |
| 2010/0228264 | A1* | 9/2010 | Robinson ............... A61B 34/30 606/130 |
| 2017/0165013 | A1 | 6/2017 | Itkowitz et al. |
| 2017/0210012 | A1 | 7/2017 | Larkin et al. |
| 2018/0064499 | A1* | 3/2018 | Itkowitz ................. A61B 17/29 |
| 2018/0296280 | A1 | 10/2018 | Kurihara et al. |
| 2018/0297206 | A1 | 10/2018 | Larkin et al. |
| 2019/0038335 | A1 | 2/2019 | Mohr et al. |
| 2019/0314005 | A1* | 10/2019 | Ishihara ................. A61B 34/74 |
| 2020/0038125 | A1* | 2/2020 | Farlow .................. A61B 34/30 |
| 2020/0331147 | A1 | 10/2020 | Larkin et al. |
| 2020/0397517 | A1* | 12/2020 | Unsworth ............... A61B 34/25 |

FOREIGN PATENT DOCUMENTS

| | | |
|---|---|---|
| JP | 2001-104333 A | 4/2001 |
| JP | 2009542362 A | 12/2009 |
| JP | 2013-188574 A | 9/2013 |
| JP | 2018508301 A | 3/2018 |
| JP | 2020048708 A | 4/2020 |

OTHER PUBLICATIONS

The Office Action issued on Oct. 1, 2024, in counterpart Japanese patent application No. 2021-011781.

* cited by examiner

TCP2
TCP

SURGICAL SYSTEM AND DISPLAY METHOD

CROSS REFERENCE TO RELATED APPLICATIONS

This application claims priority based on 35 USC 119 from prior Japanese Patent Application No. JP2021-011781 filed on Jan. 28, 2021, entitled "SURGICAL SYSTEM AND DISPLAY METHOD", the entire contents of which are incorporated herein by reference.

BACKGROUND

The disclosure may relate to a surgical system and a display method, and more particularly to a surgical system and a display method to display, in a display device, a graphical user interface on an image captured by an endoscope in an overlapped manner.

In a related art, there is known a robotic surgical system that superimposes and displays a graphical user interface on an image captured by an endoscope (see, for example, Patent Document 1).

In the robotic surgical system disclosed in Patent Document 1, the endoscope captures an image of a surgical site, in order to display the captured image in a viewing area (image display area) of a monitor screen. In the robotic surgical system, a current position of a surgical tool is determined relative to the image (the field of view) captured by the endoscope. Then, when the determined current position of the surgical tool is located outside the image (the field of view), a symbol indicating the current position of the surgical tool is displayed at a boundary area outside the viewing area of the monitor screen.

Patent Document 1: Japanese Patent Application Publication No. 2013-188574

SUMMARY

However, in such a robotic surgical system disclosed in Patent Document 1, an operator may concentrate on the center region of the viewing area of the monitor screen during surgery. Accordingly, even if the current position of the tool (the surgical instrument) that is located outside the field of view is displayed as the symbol (mark) in the boundary area outside the viewing area of the monitor screen, the operator may not notice the symbol. When the operator notices the symbol, the operator may need to significantly move the line of sight.

An object of one or more embodiments of the disclosure may be to provide a surgical system and a display method that allows an operator to visually recognize a mark indicating a surgical instrument that is located outside the field of view easily without significantly moving the line of sight.

A first aspect of one or more embodiments may be a surgical system that may include: manipulators that respectively support an endoscope and surgical instruments; a remote control apparatus that includes a display device configured to display an image captured by the endoscope and operation handles configured to operate the surgical instruments, respectively; and a control device configured to generate a graphical user interface and display, on the display device, the graphical user interface on the image captured by the endoscope in an overlapped manner. The control device is configured to display, in response to receiving a command that enables the endoscope to move and determining that at least one of the surgical instruments is located outside a field of view of the endoscope, a mark that corresponds to the surgical instrument that is located outside the field of view of the endoscope at a neighborhood area in a vicinity of an outer edge of a center area of the graphical user interface. The center area does not include a vicinity of an edge of a screen of the display device and includes a center of the screen of the display device.

According to the first aspect described above, the control device displays, in the screen of the display device, the graphical user interface on the image captured by the endoscope in the overlapped manner, such that the graphical user interface displays the mark indicating the at least one of the first surgical instrument and the second surgical instrument that is located outside the field of view of the endoscope at the neighborhood area in the vicinity of the outer edge of the center area of the screen of the display device, wherein the center area includes the center of the screen and does not include the vicinity of the edge of the screen. Accordingly, the mark indicating the at least one of the first surgical instrument and the second surgical instrument that is located outside the field of view is displayed at a position relatively closer to the center of the screen than the vicinity of the edge of the screen of the display device is. As a result, an operator can easily visually recognize the mark indicating the surgical instrument that is located outside the field of view without significantly moving the line of sight.

A second aspect of one or more embodiments may be a surgical system that may include: manipulators that support an endoscope and surgical instruments, respectively; a remote control apparatus that includes a display device configured to display an image captured by the endoscope, a first operation handle to operate a first surgical instrument among the surgical instruments, a second operation handle to operate a second surgical instrument among the surgical instruments, and an endoscope pedal configured, when being operated, to enable the endoscope to move according to operation of both of the first operation handle and the second operation handle together; and a control device configured to generate a graphical user interface and display, on the display device, the graphical user interface on the image captured by the endoscope in an overlapped manner. The control device is configured to display, in response to determining that the endoscope pedal is operated and that at least one of the surgical instruments is located outside a field of view of the endoscope, a mark that corresponds to the surgical instrument that is located outside the field of view of the endoscope at a neighborhood area in a vicinity of an outer edge of a center area of the graphical user interface. The center area does not include a vicinity of an edge of a screen of the display device and includes a center of the screen of the display device.

According to the second aspect described above, the control device displays, in the screen of the display device, the graphical user interface on the image captured by the endoscope in the overlapped manner, such that the graphical user interface displays the mark indicating the at least one of the first surgical instrument and the second surgical instrument that is located outside the field of view of the endoscope in the neighborhood area in the vicinity of the outer edge of the center area of the screen of the display device, wherein the center area includes the center of the screen and does not include the vicinity of the edge of the screen. Accordingly, the mark indicating the at least one of the first surgical instrument and the second surgical instrument that is located outside the field of view is displayed at a position relatively closer to the center of the screen than the vicinity of the edge of the screen of the display device is. As a result, the second aspect can provide the surgical system that allows an operator to visually recognize the mark indicating the surgical instrument that is located outside the field of view of the endoscope easily, without significantly moving the line of sight.

A third aspect of one or more embodiments may be a display method that may include: acquiring an image at a surgical site captured by an endoscope; generating a graphical user interface and displaying, on a display device, the graphical user interface on the image captured by the endoscope in an overlapped manner; and in response to receiving a command that enables the endoscope to move and determining that at least one of a first surgical instrument that is supported by a first manipulator and a second surgical instrument that is supported by a second manipulator is located outside a field of view of the endoscope, displaying a mark indicating the at least one of the first surgical instrument and the second surgical instrument that is located outside the field of view of the endoscope at a neighborhood area in a vicinity of an outer edge of a center area of the graphical user interface. The center area of the graphical user interface does not include a vicinity of an edge of a screen of the display device and includes a center of the screen of the display device.

According to the third aspect described above, the displaying of the graphical user interface includes displaying, in the screen of the display device, the graphical user interface on the image captured by the endoscope in the overlapped manner, such that the graphical user interface displays the mark indicating the at least one of the first surgical instrument and the second surgical instrument that is located outside the field of view of the endoscope in the neighborhood area in the vicinity of the outer edge of the center area of the screen of the display device, wherein the center area includes the center of the screen and does not include the vicinity of the edge of the screen. Accordingly, the mark indicating the at least one of the first surgical instrument and the second surgical instrument that is located outside the field of view is displayed at a position relatively closer to the center of the screen than the vicinity of the edge of the screen is. As a result, the third aspect can provide a display method capable of allowing an operator to visually recognize the mark indicating the surgical instrument that is located outside the field of view of the endoscope easily, without significantly moving the line of sight.

According to an embodiment of the disclosure, an operator can easily visually recognize a mark indicating a surgical instrument that is located outside a field of view, without significantly moving a line of sight.

DETAILED DESCRIPTION

Figure 1:
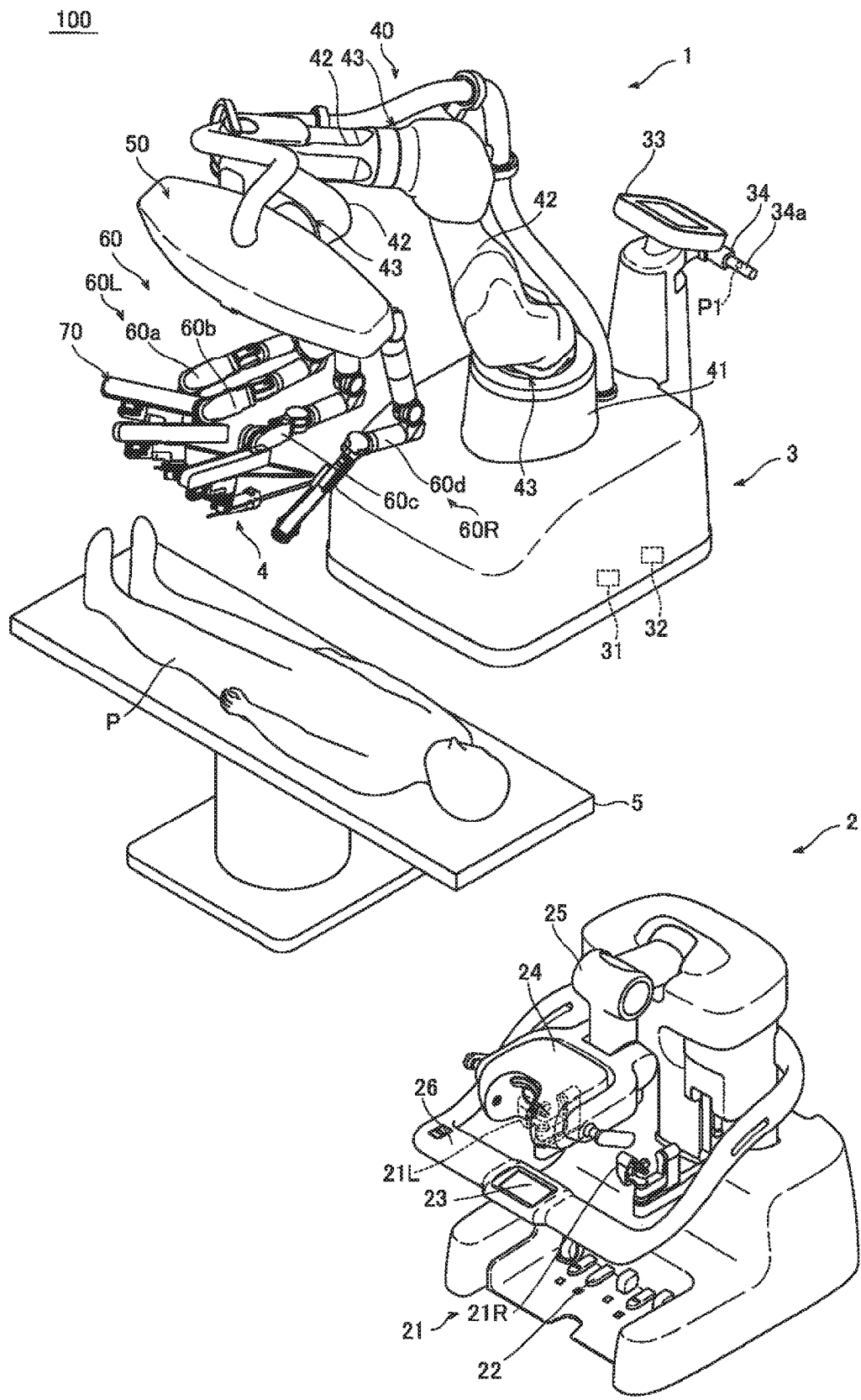
FIG. 1 is a diagram illustrating a view of a configuration of a surgical operation system according to a first embodiment.

Descriptions are provided hereinbelow for one or more embodiments based on the drawings. In the respective drawings referenced herein, the same constituents are designated by the same reference numerals and duplicate explanation concerning the same constituents is omitted. All of the drawings are provided to illustrate the respective examples only.

First Embodiment

A configuration of a surgical operation system 100 according to a first embodiment is described with reference to FIGS. 1 to 24. The surgical operation system 100 includes a medical manipulator 1 serving as a patient-side apparatus and a remote control apparatus 2 serving as an operator-side apparatus to operate the medical manipulator 1. The medical manipulator 1 is provided with a medical trolley 3 and is thus configured to be movable. The remote control apparatus 2 is provided at a location away from the medical manipulator 1. The medical manipulator 1 is configured to be remotely operated by the remote control apparatus 2. An operator (such as a doctor) inputs to the remote control apparatus 2 an instruction that causes the medical manipulator 1 to perform a desired operation. The remote control apparatus 2 transmits the inputted instruction to the medical manipulator 1. The medical manipulator 1 operates in response to the received instruction. The medical manipulator 1 is disposed in a surgery room, as a sterile field, which is sterilized. The surgical operation system 100 is an example of a "surgical system."

The remote control apparatus 2 is disposed inside the surgery room or outside the surgery room, for example. The remote control apparatus 2 includes operation handles 21, foot pedals 22, a touch panel 23, a monitor 24, a support arm 25, and a support bar 26. The operation handles 21 are hand controllers (HC) provided for the operator (such as a doctor) to input instructions. Note that the monitor 24 is an example of a "display device."

The operation handles 21 are configured to operate the medical instruments 4. Specifically, the operation handles 21 receive an amount of movement inputted by the operator O to operate the medical instruments 4. The operation handles 21 include an operation handle 21L, which is arranged on the left side of the operator (such as a doctor) and is to be operated by the left hand of the operator O, and an operation handle 21. R, which is arranged on the right side of the operator and is to be operated by the right hand of the operator O. The operation handle 21L and the operation handle 21R are examples of a "first operation handle" and a "second operation handle", respectively.

Figure 3:
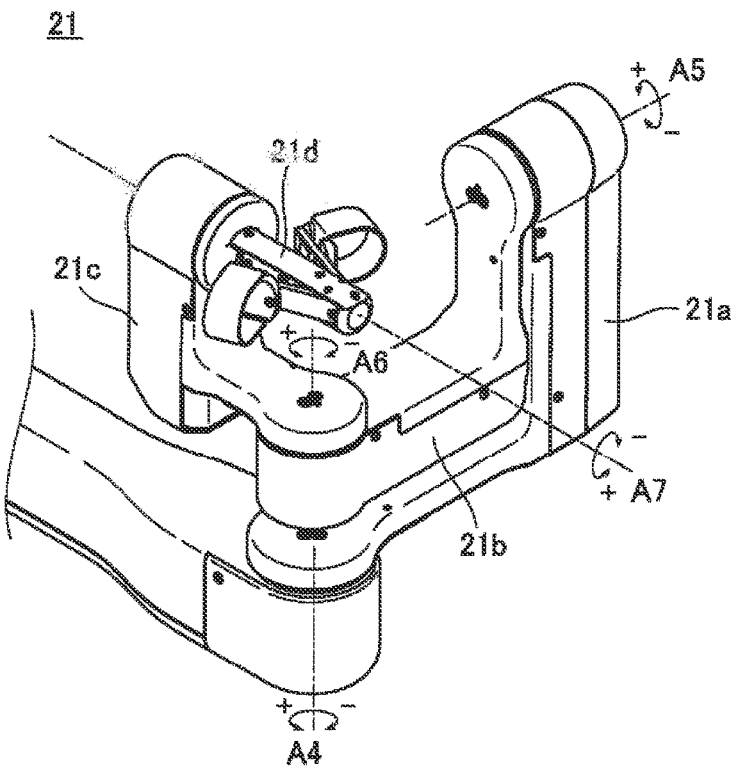
FIG. 3 is a diagram illustrating a view of a configuration of an operation handle according to a first embodiment.

As illustrated in FIG. 3, each of the operation handles 21 includes a link portion 21a, a link portion 21b, a link portion 21c, and a link portion 21d that is to be operated by the operator (such as a doctor). The link portion 21a is rotatable about an axis (joint) A4. By rotating the link portion 21a around the axis A4, an arm portion 61 described later rotates about an axis (joint) JT4. The link portion 21b is rotatable about an axis (joint) A5 with respect to the link portion 21a. By rotating the link portion 21b around the axis A5, the arm portion 61 described later rotates about an axis (joint) JT5. The link portion 21c is rotatable about an axis (joint) A6 with respect to the link portion 21b. By rotating the link portion 21c around the axis A6, the arm portion 61 rotates about an axis (joint) JT6. The link portion 21d is rotatable about an axis (joint) A7 with respect to the link portion 21c. By rotating the link portion 21d around the axis A7, the arm portion 61 rotates about an axis (joint) JT7. The medical instrument 4 is an example of a "surgical instrument", a "first surgical instrument", or a "second surgical instrument."

Further, a movement amount of the arm 60 (medical instrument 4) is scaled (changed) with respect to the operation amount received by the operation handle 21. For example, when the movement scaling ratio is set to 1/2, the medical instrument 4 moves 1/2 of the movement distance of the operation handle 21. This allows for precise fine surgery. The arm 60 is an example of a "manipulator."

Figure 4:
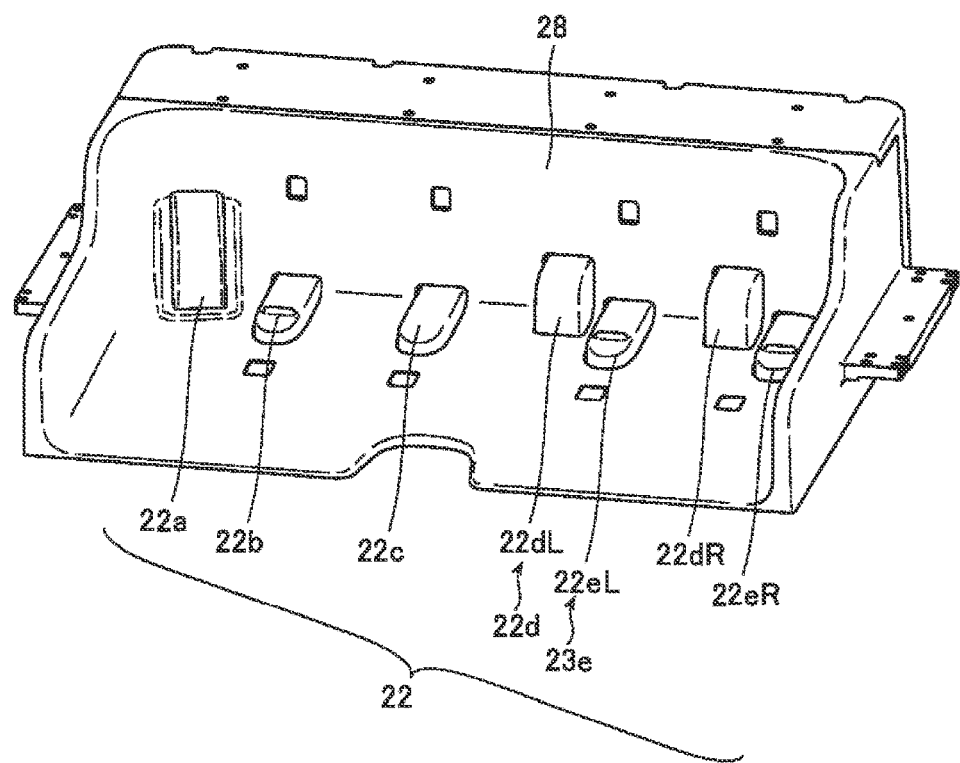
FIG. 4 is a diagram illustrating a view of foot pedals according to a first embodiment.

As illustrated in FIG. 4, the plural foot pedals 22 are provided to execute functions of the medical instrument 4. The plural foot pedals 22 are arranged on a base 28. The foot pedals 22 include a switch pedal 22a, a clutch pedal 22b, a camera pedal 22c, cutting pedals 22d, and coagulation pedals 22e. The switch pedal 22a, the clutch pedal 22b, the camera pedal 22c, the cutting pedals 22d, and the coagulation pedals 22e are operated by the foot of the operator. The cutting pedals 22d include a cutting pedal 22dR for the right arm 60 and a cutting pedal 22dL for the left arm 60. The coagulation pedals 22e include a coagulation pedal 22eR for the right arm 60 and a coagulation pedal 22eL for the left arm 60. The foot pedal 22 is an example of an "operation pedal." The camera pedal 22c is an example of an "input device" or an "endoscope pedal."

The switch pedal 22a is configured to select one of the arms 60 that is to be operated by the operation handles 21. In a first embodiment, the clutch pedal 22b is configured to perform a clutch operation that temporarily disconnects an operational connection (a control-related connection) between the arm 60 and the operation handle 21. While the clutch pedal 22b is depressed by the operator, the operation by the operation handle 21 is not transmitted to the arm 60.

In a first embodiment, the camera pedal 22c is provided for inputting a command that allows the endoscope 6 to be moved. Specifically, in response to the camera pedal 22c being depressed (stepped) by the operator, the command that allows the endoscope 6 to be moved is inputted. That is, while the command that enables the endoscope 6 to move is being inputted by the camera pedal 22c (that is, while the camera pedal 22c is depressed by the operator), the endoscope 6 is able to be moved by moving both of the operation handle 21. R and operation handle 21L.

While the cutting pedal 22d (coagulation pedal 22e) is depressed (stepped) by the operator, an electrosurgical device (not illustrated) is activated.

As illustrated in FIG. 1, the monitor 24 is a display device of a scope type configured to display an image (see FIG. 13) captured by the endoscope 6. The support arm 25 supports the monitor 24 in such a manner that the height of the monitor 24 is adjusted to the height of the face of the operator (such as a doctor). The touch panel 23 is disposed on the support bar 26. When a sensor(s) provided in the vicinity of the monitor 24 detects the head of the operator, the medical manipulator 1 is allowed to be operated by the remote control apparatus 2. The operator operates the operation handles 21 and the foot pedals 22, while viewing the surgical site (or affected area) displayed on the monitor 24. With this, the instruction is inputted to the remote control apparatus 2. The instruction that is inputted to the remote control apparatus 2 is transmitted to the medical manipulator 1.

The medical trolley 3 is provided with a control unit 31 that controls the operation of the medical manipulator 1 and a storage 32 that stores therein programs for controlling the operation of the medical manipulator 1. Based on the instruction inputted to the remote control apparatus 2, the control unit 31 of the medical trolley 3 controls the operation of the medical manipulator 1.

Further, the medical trolley 3 is provided with an input device 33. The input device 33 is configured to accept operations to move or change posture of a positioner 40, an arm base 50, and the arms 60, mainly to prepare for surgery before the surgery.

Figure 2:
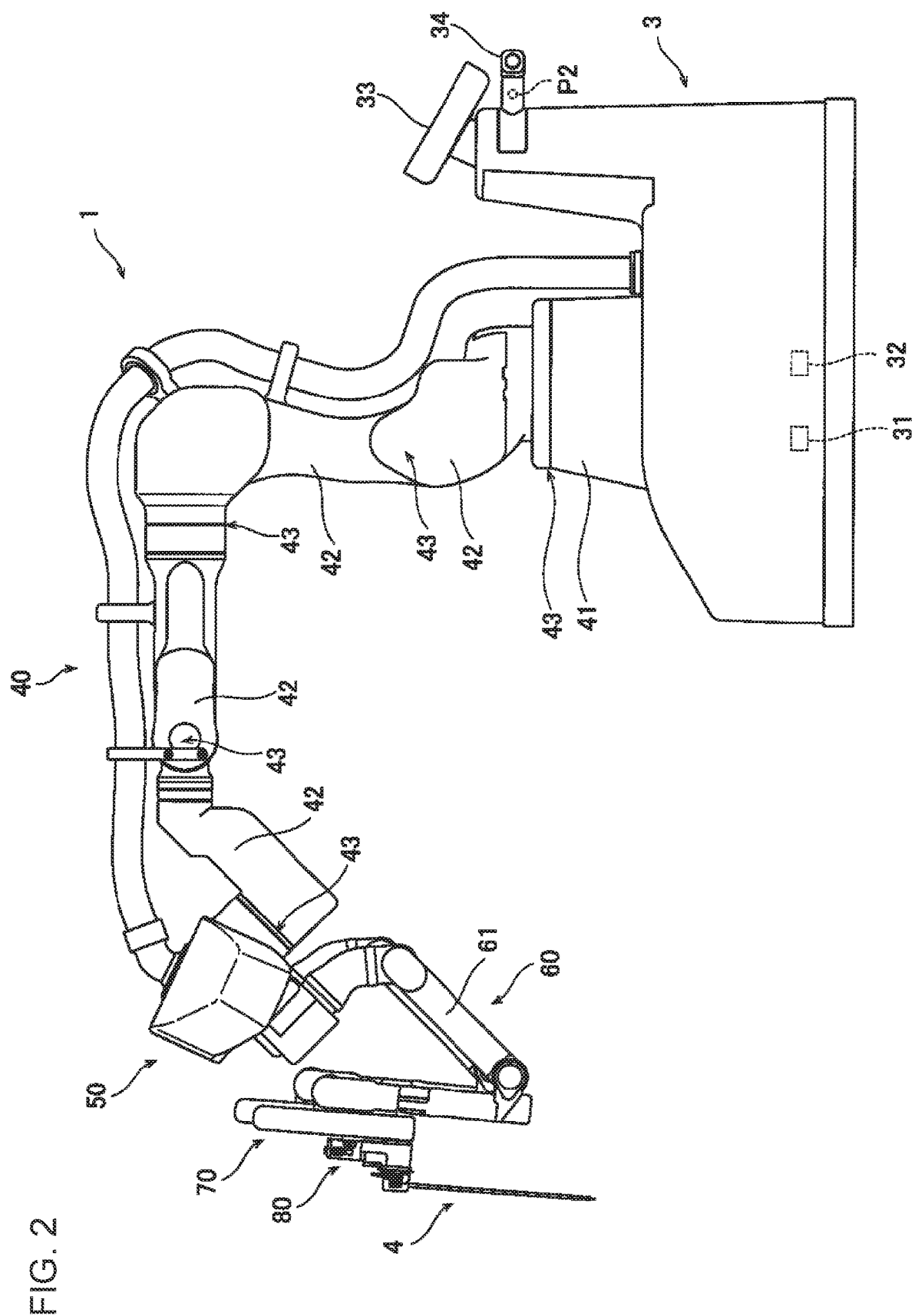
FIG. 2 is a diagram illustrating a view of a configuration of a medical manipulator according to a first embodiment.

As illustrated in FIGS. 1 and 2, the medical manipulator 1 is disposed in the surgery room. The medical manipulator 1 includes the medical trolley 3, the positioner 40, the arm base 50, and the arms 60. The arm base 50 is attached to a distal end of the positioner 40. The arm base 50 is a relatively long rod shape (elongate shape). Base portions (proximal end portions) of the arms 60 are attached to the arm base 50. Each of the arms 60 is configured such that the arm 60 is able to take a folded posture (storage posture). The arm base 50 and the arms 60 are used with being covered with a sterile drape (not illustrated). The arm 60 supports the medical instrument 4. Note that the medical instrument 4 is an example of a "surgical instrument."

The positioner 40 is configured as a 7-axis articulated robot. The positioner 40 is disposed on the medical trolley 3. The positioner 40 is configured to move the arm base 50. Specifically, the positioner 40 is configured to move the position of the arm base 50 three-dimensionally.

The positioner 40 includes a base portion 41 and link portions 42 connected to the base portion 41. The link portions 42 are connected to each other via joints 43.

As illustrated in FIG. 1, to the distal end of each of the arms 60, the medical instrument 4 is attached. The medical instruments 4 include, for example, an instrument that is replaceable, an endoscope 6 (see FIG. 8) configured to capture an image of a surgical site, and the like.

Figure 5:
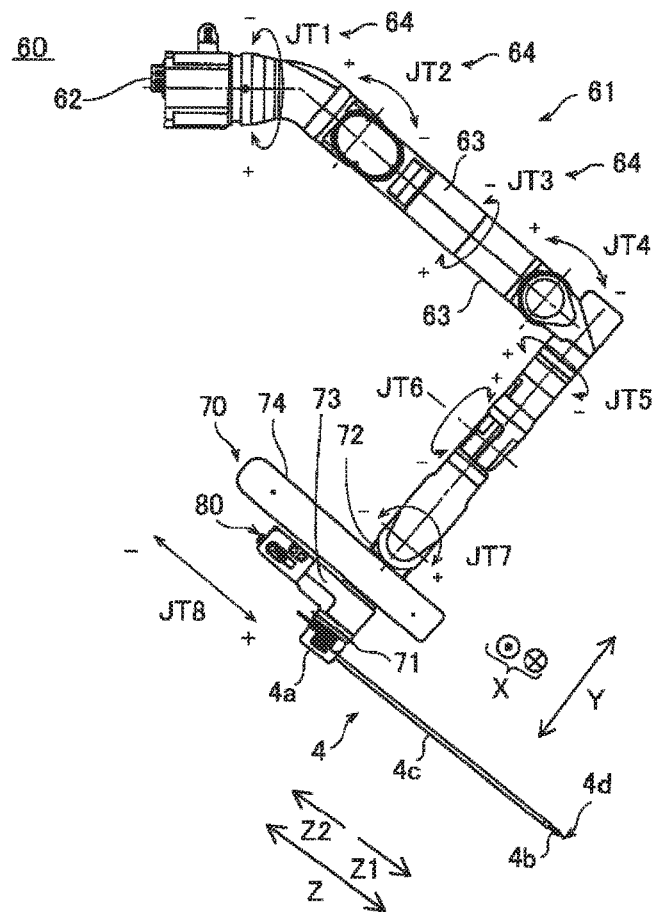
FIG. 5 is a diagram illustrating a view of a configuration of an arm of the medical manipulator according to a first embodiment.

As illustrated in FIG. 5, the instrument is provided with a driven unit 4a, which is driven by servomotors M2 provided in a holder 71 of the arm 60. To the distal end of the instrument, forceps 4b as an end effector is provided.

Figure 6:
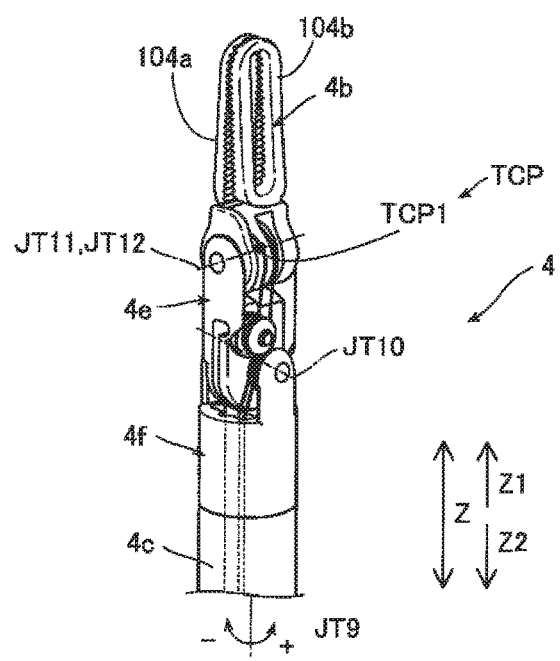
FIG. 6 is a diagram illustrating a view of forceps.

As illustrated in FIG. 6, the instrument includes: a first support 4e having a distal end portion thereof that rotatably supports proximal end portions of end effector members 104a and 104b about an axis (joint) JT11; a second support 4f having a distal end portion thereof that rotatably supports a proximal end portion of the first support 4e about an axis (joint) JT10; and a shaft 4c connected a proximal end portion of the second support 4f. The driven unit 4a, the shaft 4c, the second support 4f, the first support 4e, and the forceps 4b are arranged along the Z direction. The axis JT11 is orthogonal to a direction (Z direction) in which the shaft 4c extends. The axis JT10 is provided away from the axis JT11 in the direction in which the shaft 4c extends, and is orthogonal to the axis JT11 and orthogonal to the direction in which the shaft 4c extends.

The forceps 4b is attached to the first support 4e so as to be rotatable about the axis JT11. The second support 4f rotatably supports the first support 4e about the axis JT10. In other words, the first support 4e is attached to the second support 4f so as to be rotatable about the axis JT10. A distal side (Z1 side) portion of the first support 4e has a U-shape. A tool center point (TCP1, Clevis) is set at the center of the U-shaped distal side portion of the first support 4e along the axis JT11.

The medical instrument 4 (forceps 4b) includes an axis (joint) JT9 as a rotation axis of the shaft 4c (an axis (joint) along the direction in which the shaft 4c extends) and an axis (joint) JT12 about which the forceps 4b open and close. Note that the number of the servomotors M2 provided in the holder 71 of the arm 60 is two or more (for example, four). Rotors (rotation members) in the driven unit 4a are driven by the plurality of servomotors M2. As a result, the medical instrument 4 is driven about the J9 axis to the J12 axis.

Figure 8:
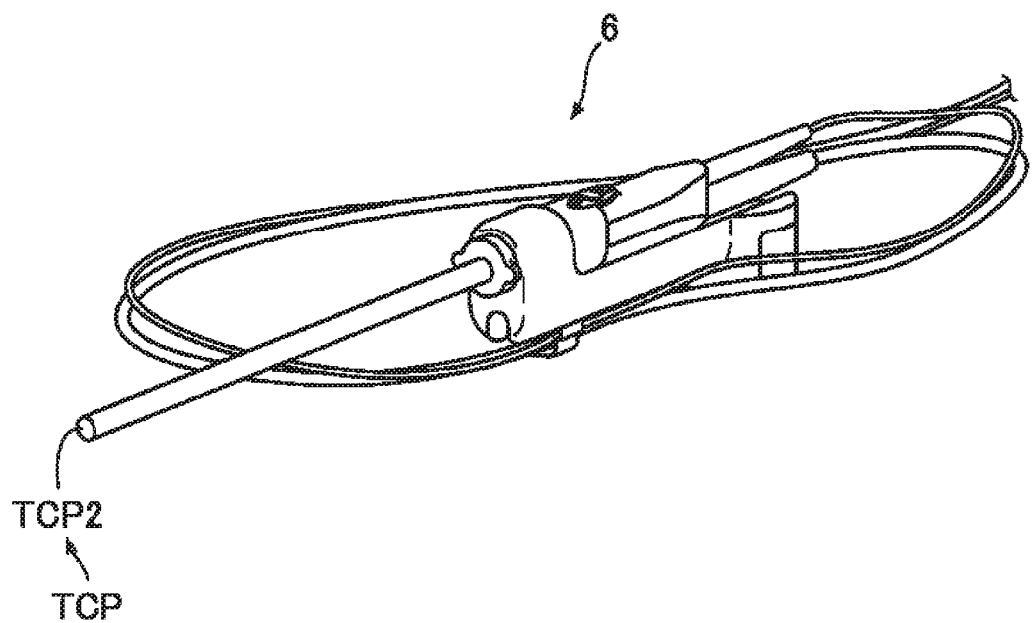
FIG. 8 is a diagram illustrating a view of an endoscope.
Figure 9:
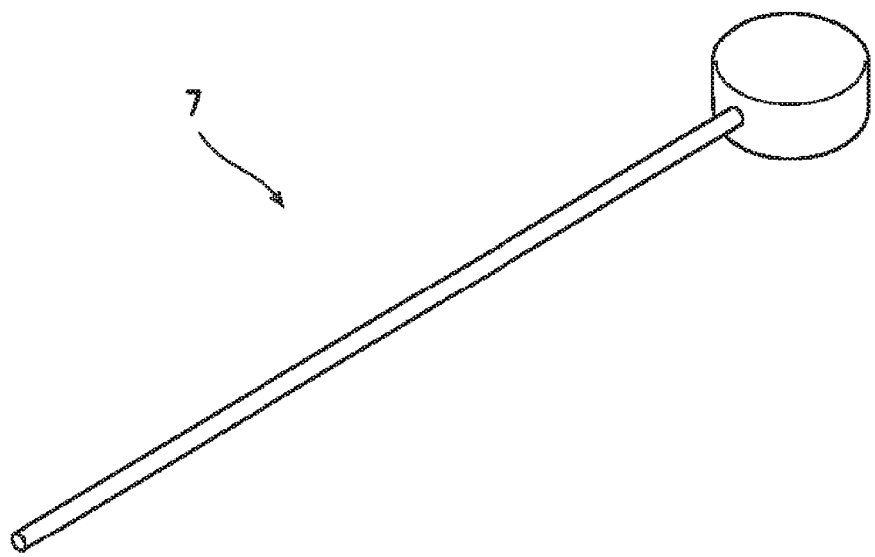
FIG. 9 is a diagram illustrating a view of a pivot position setting device.

As illustrated in FIG. 8, a tool center point TCP2 of the endoscope 6 is set at the distal end of the endoscope 6.

Next, a configuration of the arm 60 is described in detail.

As illustrated in FIG. 5, the arm 60 includes an arm portion 61 (the base portion 62, the link portions 63, the joint portions 64) and a translation movement mechanism 70 provided at the distal end portion of the arm portion 61. The arm 60 is configured such that the distal end portion thereof is three-dimensionally movable with respect to the proximal side (the arm base 50) of the arm 60. The arm portion 61 is configured as a 7-axis articulated robot arm. The plural arms 60 have the same configuration.

Figure 12:
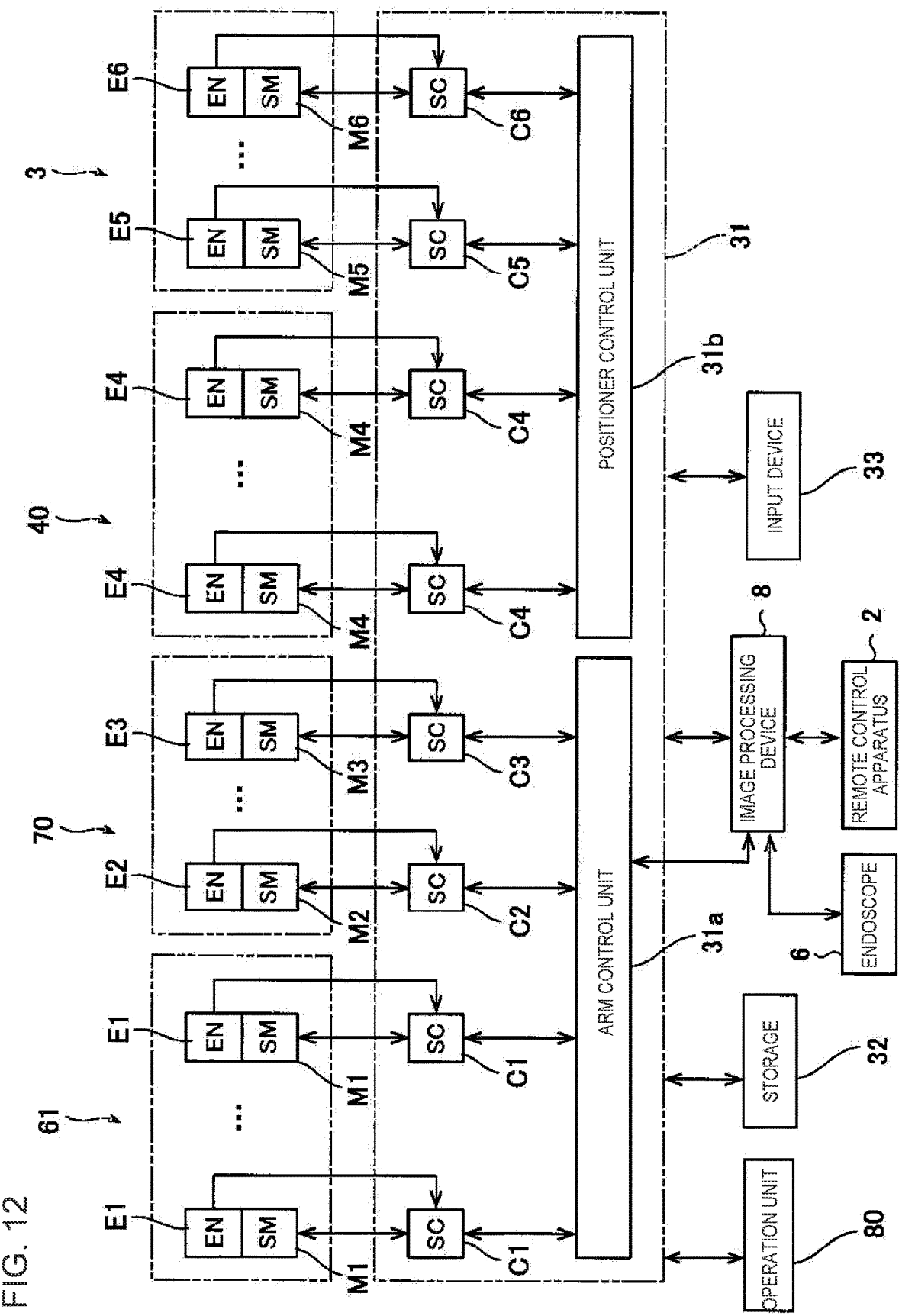
FIG. 12 is a block diagram of a configuration of a control unit of the medical manipulator according to a first embodiment.

As illustrated in FIG. 5, the arm 60 includes the axis (joints) JT1 to JT7 as rotation axes and an axis (joint) J8 as a linear motion axis. The joints JT1 to JT7 correspond to the rotation axes of the joint portions 64 of the arm portion 61. The joint JT7 corresponds to the proximal end side link portion 72 of the translational movement mechanism 70. A joint JT8 is an axis for moving the distal end side link portion 73 of the translational movement mechanism 70 relative to the proximal end side link portion 72 along the Z direction. That is, the servomotors M1 illustrated in FIG. 12 are provided to correspond to the joints JT1 to JT7 of the arm 60. The servomotor M3 is provided to correspond to the joint JT8.

The translation movement mechanism 70 is provided on a side of the distal end of the arm portion 61. The medical instrument 4 is attached to the translation movement mechanism 70. The translation movement mechanism 70 translationally moves the medical instrument 4 in the insertion direction of the medical instrument 4 into a patient P. The translation movement mechanism 70 is configured to translationally move the medical instrument 4 relative to the arm portion 61. Specifically, the translation movement mechanism 70 is provided with the holder 71 configured to hold the medical instrument 4. The holder 71 accommodates therein the servo-motors M2 (see FIG. 12).

Figure 7:
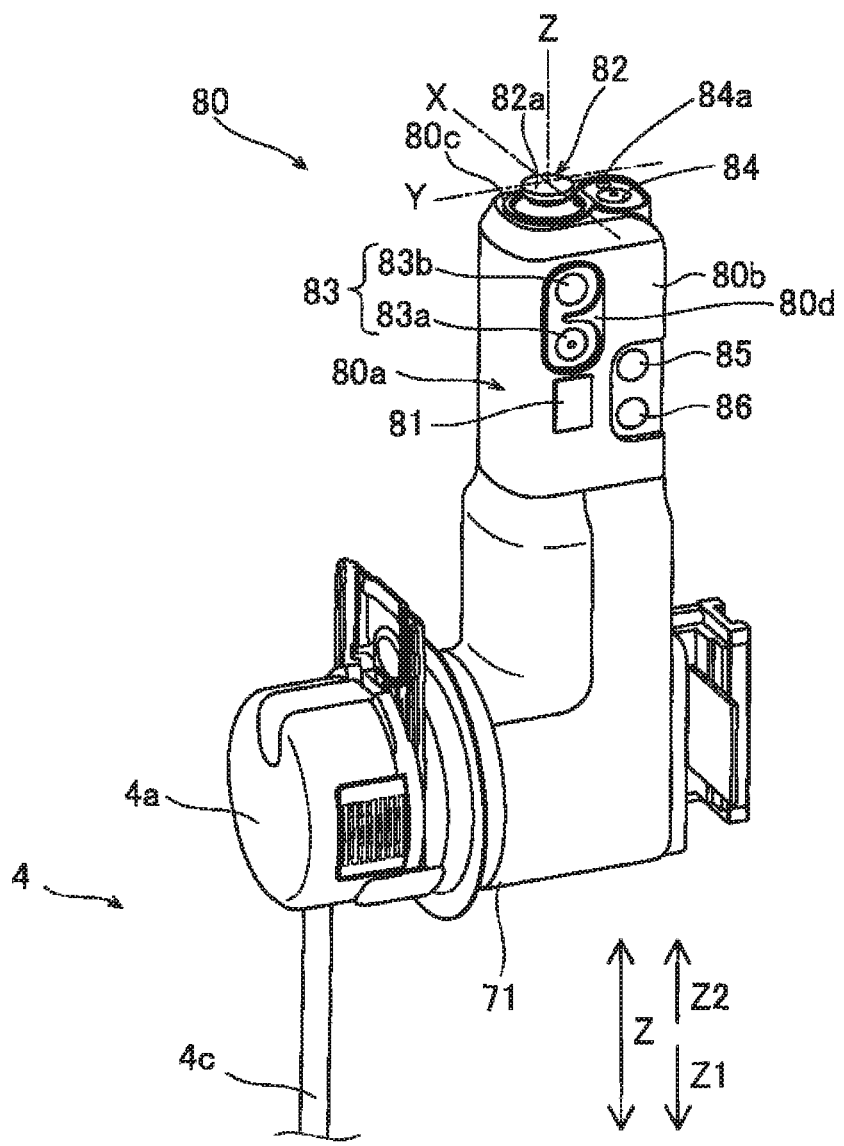
FIG. 7 is a diagram illustrating a perspective view of a configuration of an operation unit of the medical manipulator according to a first embodiment.

As illustrated in FIG. 7, the medical manipulator 1 includes an operation unit 80 (manipulation unit) which is attached to each of the arms 60 to operate the arm 60. The operation unit 80 includes an enable switch 81, a joystick 82, and a switch section 83. The enable switch 81 enables or disables the movements of the arm 60 in response to the joystick 82 and the switch section 83. When the enable switch 81 being depressed by an operator (nurse, assistant, etc.) gripping the operation unit 80, the enable switch 81 enables the medical instrument 4 to move by the arm 60.

The switch section 83 includes: a switch 83a for moving the medical instrument 4 in the direction in which the medical instrument 4 is inserted into the patient P along the longitudinal direction of the medical instrument 4; and a switch 83b for moving the distal end 4d of the medical instrument 4 in the direction opposite to the direction in which the medical instrument 4 is inserted into the patient P. Both the switch 83a and the switch 83b are composed of push button switches.

As illustrated in FIG. 7, the operation unit 80 includes a pivot button 85 for setting a pivot position PP that serves as a fulcrum (see FIG. 11) for the movement of the medical instrument 4 attached to the arm 60. The pivot button 85 is provided on a surface 80b of the operation unit 80 so as to be adjacent to the enable switch 81. The pivot position PP is set by pressing the pivot button 85 in a state where the distal end of the endoscope 6 (see FIG. 8) or the distal end of the pivot position setting device 7 (FIG. 9) is moved to a position corresponding to an insertion position of the trocar T inserted into the body surface S of the patient P. The pivot position PP set is stored in the storage 32. In the teaching of the pivot position PP, the pivot position PP is set as one point (coordinate), but the teaching of the pivot position PP does not set the direction of the medical instrument 4.

As illustrated in FIG. 1, the endoscope 6 is attached to one (for example, the arm 60c) of the plural arms 60, and the medical instruments 4 other than the endoscope 6 are attached to the other arms 60 (for example, the arms 60a, 60b, and 60d). Specifically, in surgery, the endoscope 6 is attached to one of the four arms 60, and the medical instruments 4 (forceps 4b, etc.) other than the endoscope 6 are attached to the other three arms 60. In the state where the endoscope 6 is attached to the arm 60, the pivot position PP for the endoscope 6 is set to the arm 60 to which the endoscope 6 is attached. Further, in the state where the pivot position setting device 7 is attached to the arm 60 to which the medical instrument 4 other than the endoscope 6 is attached, the pivot position PP for the medical instrument 4 is set to the arm 60 to which the medical instrument 4 other than the endoscope 6 is attached. The endoscope 6 is attached to one of two arms 60 (arms 60b and 60c) arranged in the center area among the four arms 60 arranged adjacent to each other. That is, the pivot position PP is individually set for each of the plurality of arms 60. Note that the arm 60 (for example, the arm 60c) that supports the endoscope 6 is an example of a "third manipulator".

As illustrated in FIG. 7, the surface 80b of the operation unit 80 is provided with an adjustment button 86 for optimizing the position of the arm 60. After the pivot position PP is set to the arm 60 to which the endoscope 6 is attached, the positions of the other arms 60 (arm bases 50) are optimized by pressing the adjustment button 86.

As illustrated in FIG. 7, the operation unit 80 includes a mode switch button 84 for switching between a translational movement mode (see FIG. 10) to translationally move the medical instrument 4 attached to the arm 60 and a rotational movement mode (see FIG. 11) for rotationally move the medical instrument 4 attached to the arm 60. In the vicinity of the mode switch button 84, a mode indicator 84a is provided. The mode indicator 84a displays the switched mode (the current mode). Specifically, when the mode indicator 84a is turned on (rotational movement mode) or off (translational movement mode), the current mode (translational movement mode or rotational movement mode) is displayed.

Further, the mode indicator 84a also serves as a pivot position indicator that indicates that the pivot position PP has been set.

Figure 10:
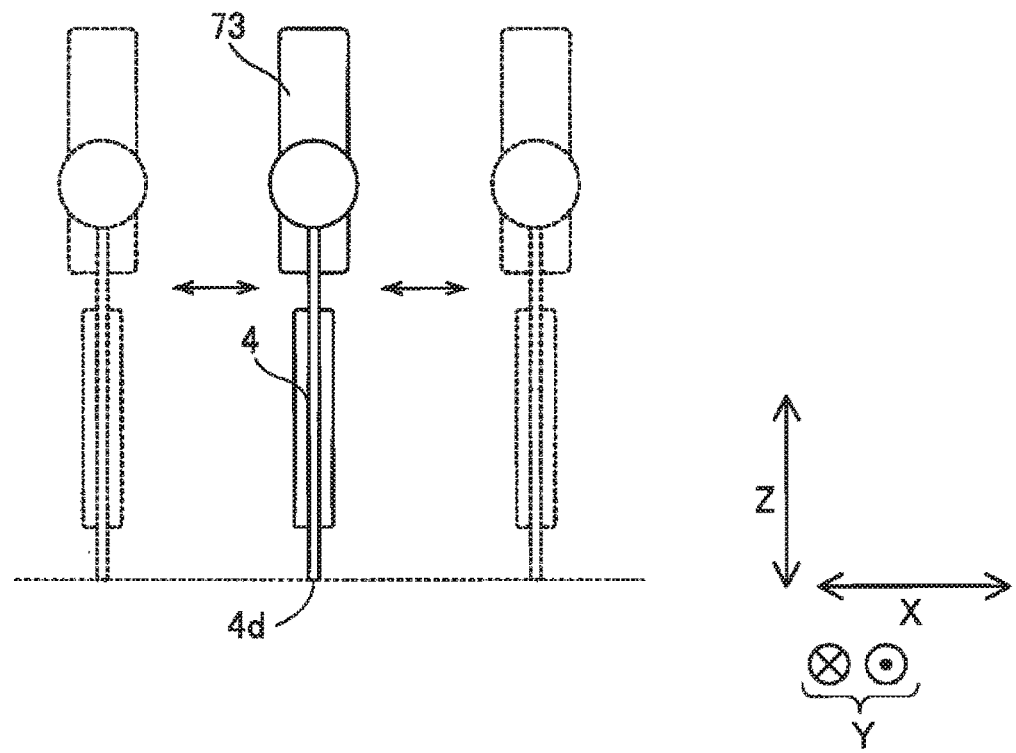
FIG. 10 is a diagram illustrating a view for explaining translational movements of the arm.
Figure 11:
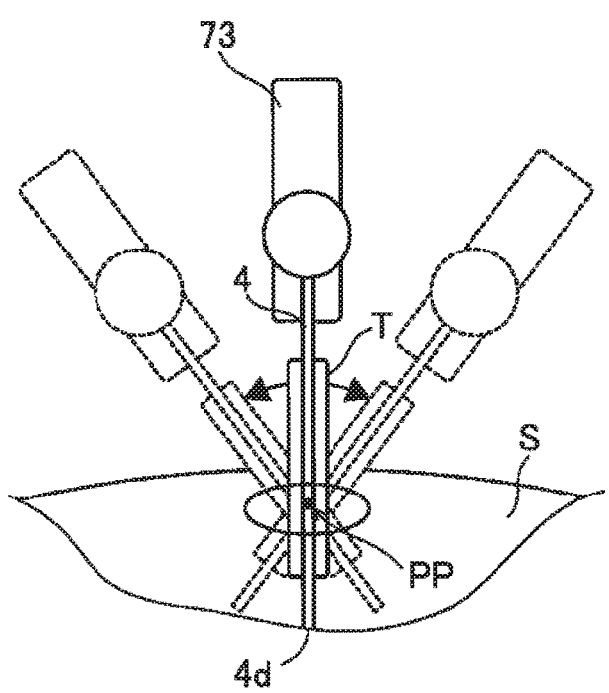
FIG. 11 is a diagram illustrating a view for explaining rotational movements of the arm.

As illustrated in FIG. 10, in the translational movement mode to translationally move the arm 60, the arm 60 is moved in such a manner that the distal end 4d of the medical instrument 4 moves on the XY plane. Further, as illustrated in FIG. 11, in the rotational movement mode in which the medical instrument 4 is to be rotationally moved, when the pivot position PP is not set by the operator, the arm 60 is moved such that the medical instrument 4 is rotated around the forceps 4b, and when the pivot position PP is set by the operator, the arm 60 is moved such that the medical instrument 4 is rotated around the pivot position PP as a fulcrum. The medical instrument 4 is rotationally moved in the state where the shaft 4c of the medical instrument 4 is inserted in the trocar T.

As illustrated in FIG. 12, the arm 60 is provided with the plurality of servomotors M1, a plurality of encoders E1, and a plurality of speed reducers (not illustrated), so as to correspond to the plurality of joint portions 64 of the arm portion 61. The encoder E1 is configured to detect the rotation angle of the servomotor M1. The speed reducer is configured to reduce the rotation of the servomotor M1 to increase the torque.

As illustrated in FIG. 12, the translational movement mechanism 70 includes the servomotors M2 for rotating the rotors (rotation members) provided in the driven unit 4a of the medical instrument 4, a servomotor M3 for translationally moving the medical instrument 4, encoders E2, an encoder E3, and speed reducers (not illustrated). The encoders E2 and the encoder E3 are configured to detect the rotation angles of the servomotors M2 and the servomotor M3, respectively. The speed reducers are configured to reduce the rotations of the servomotors M2 and the servomotor M3 to increase the torque thereof.

The positioner 40 is provided with a plurality of servomotors M4, a plurality of encoders E4, and a plurality of speed reducers (not illustrated), so as to correspond to the plurality of joints 43 of the positioner 40. The encoders E4 detect the rotation angles of the servomotors M4. The speed reducers are configured to reduce the rotations of the servomotors M4 to increase the torque thereof.

The medical trolley 3 is provided with servomotors M5 that drive a plurality of front wheels (not illustrated) of the medical trolley 3 respectively, encoders E5, speed reducers (not illustrated), and brakes (not illustrated). The speed reducer is configured to reduce the rotation of the servomotor M5 to increase the torque. A throttle 34a of the medical trolley 3 is provided with a potentiometer P1 (see FIG. 1). The servomotors M5 for the front wheels are driven based on the rotation angle detected by the potentiometer P1 according to the rotation of the throttle portion 34a. The rear wheels (not illustrated) of the medical trolley 3 are a twin-wheel type and are steered based on the left-right rotation of an operation handle 34. The operation handle 34 of the medical trolley 3 is provided with a potentiometer P2 (see FIG. 2). The rear wheels of the medical trolley 3 are provided with servomotors M6, encoders E6, and speed reducers (not illustrated). The speed reducer is configured to reduce the rotation of the servomotor M6 to increase the torque. The servomotors M6 for the rear wheels are driven based on the rotation angle detected by the potentiometer P2 according to the left-right rotation of the operation handle 34. That is, the steering of the rear wheels by the left-right rotation of the operation handle 34 is power-assisted by the servomotors M6.

Further, the medical trolley 3 moves in the front-rear direction by driving the front wheels. By rotating the operation handle 34 of the medical trolley 3, the rear wheels of the medical trolley 3 are steered and thus the medical trolley 3 is rotated in the left-right direction.

The control unit 31 of the medical trolley 3 includes an arm control unit 31a that controls the movement of the plurality of arms 60 based on commands, and a positioner control unit 31b that controls the movement of the positioner 40 and driving of the front wheel (not illustrated) of the medical trolley 3 based on commands. A servo control unit C1 that controls the servomotors M1 for driving the arm 60 is electrically connected to the arm control unit 31a. Further, an encoder E1 that detects the rotation angle of the servomotor M1 is electrically connected to the servo control unit C1.

A servo control unit C2 that controls the servomotors M2 for driving the medical instrument 4 is electrically connected to the arm control unit 31a. The encoders E2 that detect the rotation angles of the servomotors M2 are electrically connected to the servo control unit C2. The servo control unit C3 that controls the servomotor M3 for translationally moving by the translational movement mechanism 70 is electrically connected to the arm control unit 31a. The encoder E3 for detecting the rotation angle of the servomotor M3 is electrically connected to the servo control unit C3.

The operation command inputted to the remote control apparatus 2 is inputted to the arm control unit 31a. The arm control unit 31a generates position commands based on the operation command inputted and the rotation angles detected by the encoders E1 (E2, E3), and outputs the position commands to the servo control units C1 (C2, C3). The servo control units C1 (C2, C3) generate torque commands based on the position commands inputted from the arm control unit 31a and the rotation angles detected by the encoders E1 (E2, E3), and output the torque commands to the servomotors M1 (M2, M3). As a result, the arm 60 is moved so as to comply with the operation command inputted to the remote control apparatus 2.

As illustrated in FIG. 12, the control unit 31 (arm control unit 31a) is configured to operate the arm 60 based on an input signal from the joystick 82 of the operation unit 80. Specifically, the arm control unit 31a generates position commands based on the input signal (operation command) inputted from the joystick 82 and the rotation angles detected by the encoders E1, and outputs the position commands to the servo control units C1. The servo control unit C1 generates torque commands based on the position command inputted from the arm control unit 31a and the rotation angles detected by the encoders E1, and outputs the torque commands to the servomotors M1. As a result, the arm 60 is moved so as to follow the operation command inputted to the joystick 82.

The control unit 31 (arm control unit 31a) is configured to operate the arm 60 based on an input signal from the switch section 83 of the operation unit 80. Specifically, the arm control unit 31a generates position commands based on the input signal (operation command) inputted from the switch section 83 and the rotation angles detected by the encoders E1 or E3, and outputs the position commands to the servo control units C1 or C3. The servo control units C1 or C3 generate torque commands based on the position command inputted from the arm control unit 31a and the rotation angles detected by the encoders E1 or E3, and outputs the generated torque commands to the servomotors M1 or M3. As a result, the arm 60 is moved so as to follow the operation command inputted to the switch section 83.

As illustrated in FIG. 12, the servo control units C4 that control the servomotors M4 for moving the positioner 40 are electrically connected to the positioner control unit 31b. The encoders E4 that detects the rotation angles of the servomotors M4 are electrically connected to the servo control units C4. The servo control units C5 that control the servomotors 5 for driving the front wheel (not illustrated) of the medical trolley 3 are electrically connected to the positioner control unit 31b. The encoders E5 that detect the rotation angles of the servomotors M5 are electrically connected to the servo control units C5.

An operation command regarding setting of the preparation position and the like is inputted from the input device 33 to the positioner control unit 31b. The positioner control unit 31b generates position commands based on the operation command inputted from the input device 33 and the rotation angle detected by the encoder E4, and outputs the position commands to the servo control units C4. The servo control unit C4 generates torque commands based on the position command inputted from the positioner control unit 31b and the rotation angles detected by the encoders E4, and outputs the torque commands to the servomotors M4. As a result, the positioner 40 is moved so as to follow the operation command inputted to the input device 33. Similarly, the positioner control unit 31b moves the medical trolley 3 based on the operation command from the input device 33.

Here, in a first embodiment, the surgical operation system 100 includes an image processing device 8. The image processing device 8 generates a graphical user interface G (see FIG. 14) and displays, on the monitor 24 of the remote control apparatus 2, the graphical user interface G superimposed on the image (see FIG. 13) captured by the endoscope 6. The image processing device 8 is configured to obtain the image from the endoscope 6. Note that the image processing device 8 is an example of an "control device" or a "controller."

Figure 14:
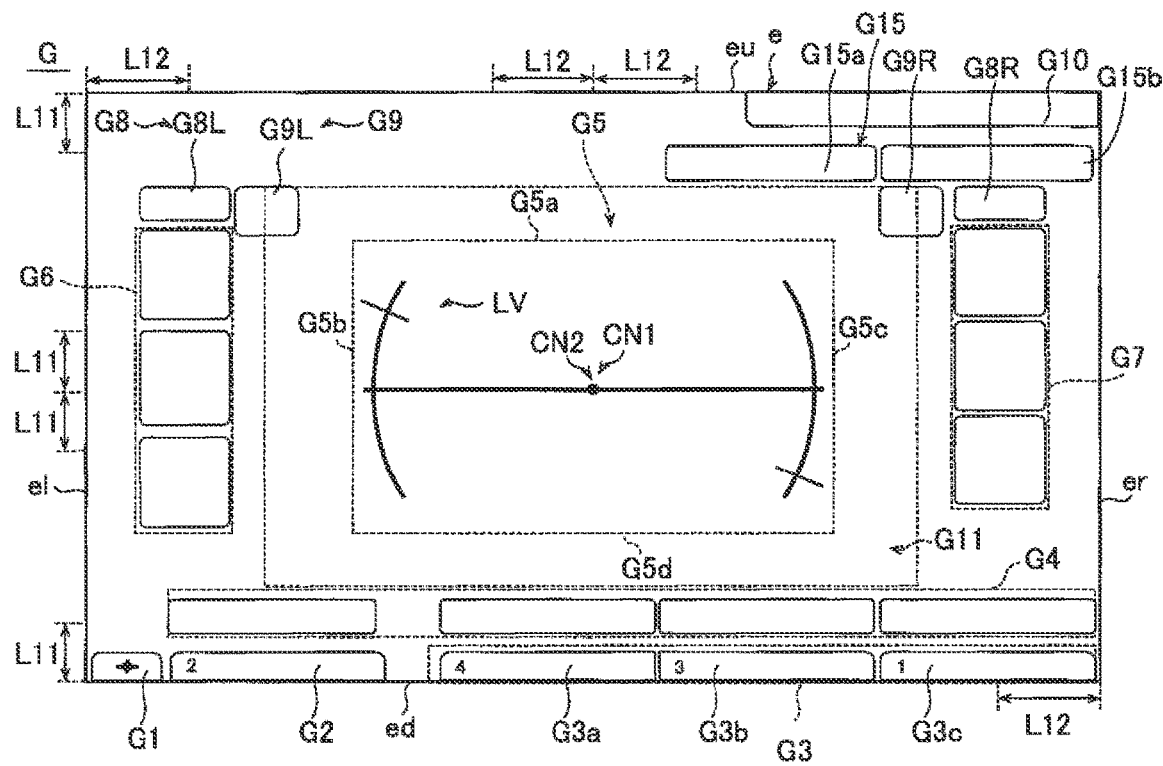
FIG. 14 is a diagram illustrating a view of the graphical user interface including a plurality of areas.
Figure 15A:
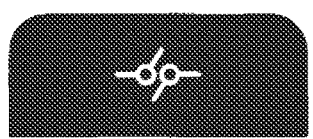
FIGS. 15A, 15B, and 15C are diagrams for explaining display states of a clutch area.
Figure 15B:
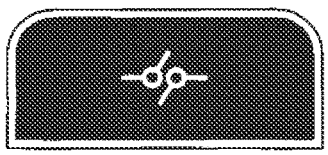
Figure 15C:
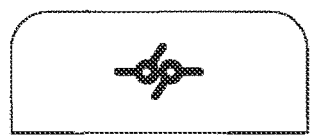
Figure 16:
FIG. 16 is a diagram for explaining a display state of a medical equipment usage information area.

As illustrated in FIG. 14, the graphical user interface G includes a clutch area G1. A state of the clutch pedal 22b is displayed in the clutch area G1 as illustrated in FIGS. 15A, 15B, and 15C. FIG. 15A illustrates the clutch area in a state (OFF state) in which the clutch pedal 22b is not depressed. FIG. 15B illustrates the clutch area in a state (hover state) in which the operator puts his/her foot on the clutch pedal 22b. FIG. 15C illustrates the clutch area in a state (ON state) in which the clutch pedal 22b is depressed.

As illustrated in FIG. 14, in a first embodiment, the graphical user interface G includes a camera area G2 indicating information relating to the endoscope 6. The camera area G2 is displayed in an area near the lower end ed (see FIG. 13) of the screen gr of the monitor 24. The camera area G2 is an example of a "fourth area".

As illustrated in FIG. 14, the graphical user interface G includes hand areas G3. The hand areas G3 display information of the medical instruments 4 attached to the arms 60 and indicate operation states of the medical instruments 4 attached to the arms 60 (and thus may serve as medical instrument operation state indicators). The hand areas G3 include: a hand area G3a that displays information about the arm 60a (the arm 60a having the identification number "4") and the medical instrument 4 attached to the arm 60a that is to be operated by the operation handle 21. L for the left hand, a hand area G3b that displays information about the arm 60b (the arm 60b having the identification number "3") and the medical instrument 4 for replacement attached to the arm 60b, and a hand area G3c that displays information about the arm 60d (the arm 60d having the identification number "1") and the medical instrument 4 attached to the arm 60d that is to be operated by the operation handle 21. R for the right hand. The hand areas G3 are displayed in an area in the vicinity of the lower end ed of the screen gr of the monitor 24. The clutch area G1 is also displayed in the area in the vicinity of the lower end ed of the screen gr of the monitor 24. Specifically, as illustrated in FIG. 14, the clutch area G1, the camera area G2, and the hand area G3 are displayed between the lower end ed of the screen gr and a position above the lower end ed of the screen gr by a length (L11) of one tenth of the vertical length of the screen gr. Note that the hand areas G3a, the hand area G3b, and the hand area G3c are examples of a "first area", a "second area", and a "third area", respectively.

The information about the arm 60 includes: the identification number (e.g., "1", "2", etc.) of the arm 60; and an arrow icon that is displayed when the arm 60 is set as a replacement destination of an arm 60 to which the medical instrument 4 for replacement is attached. The information about the medical instrument 4 includes a name (a type) of the medical instrument 4. The information about the medical instrument 4 also includes the information regarding the operation state of the medical instrument 4, e.g., indication of whether the clutch pedal 22*b*, the coagulation pedal 22*e*, the cutting pedal 22*d*, or the like for the medical instrument 4 is being operated or not.

Figure 13:
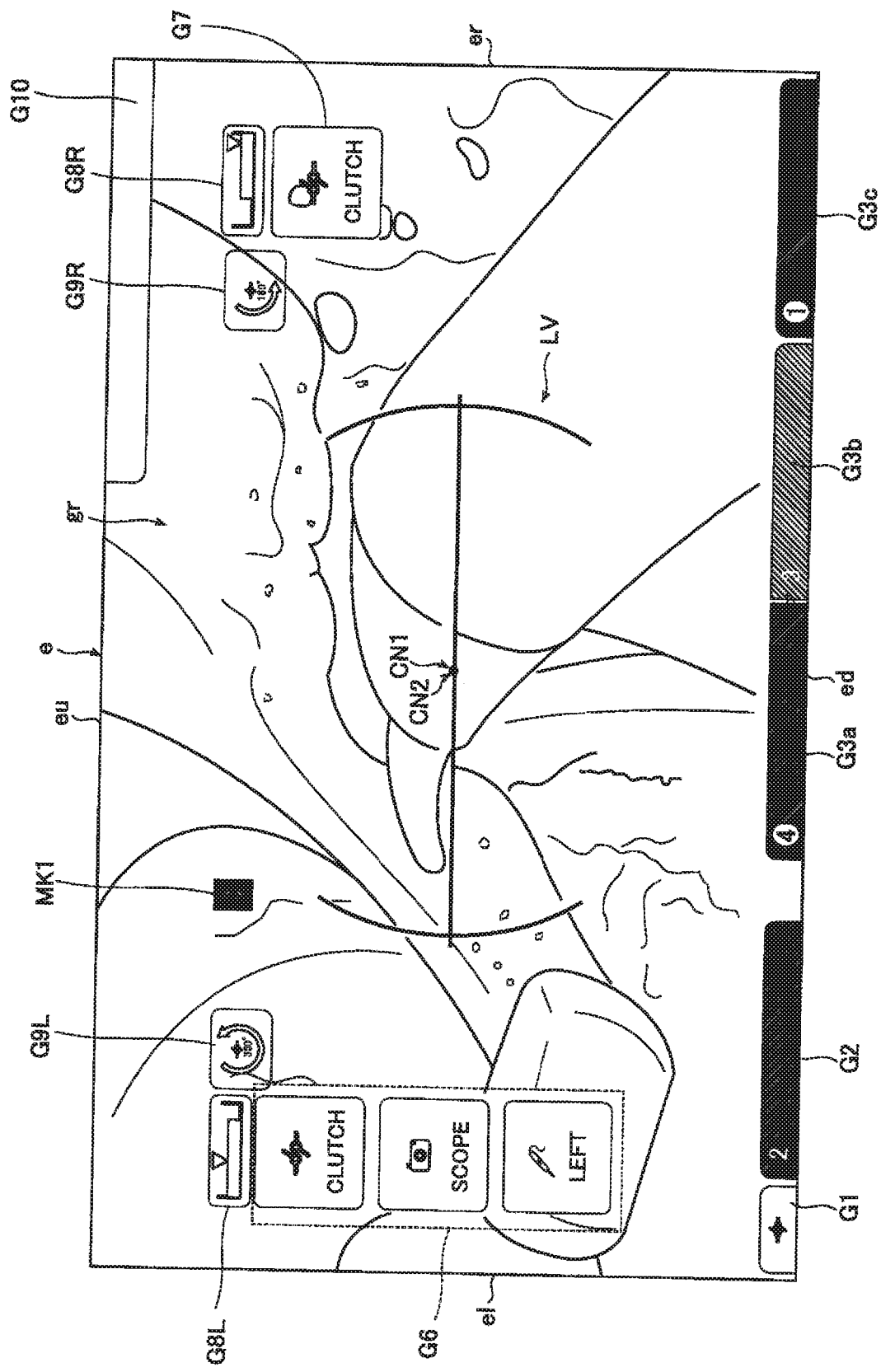
FIG. 13 is a diagram illustrating an image captured by the endoscope and a graphical user interface.

Further, as illustrated in FIG. 13, the hand areas (hand area G3*a* and hand area G3*c*) for the arms 60 that are operation targets to be operated are displayed in dark gray. In these dark gray hand areas G3*a* and G3*c*, the identification numbers "1" and "4" of the arms 60 that are the operation targets are displayed in white ovals (white elongate circles). Further, the hand area (hand area G3*b*) of the arm 60 that is not the operation target is displayed in light gray, and in this hand area G3*b*, the identification number "3" of that arm 60 is displayed in an even lighter gray color lighter than the light gray color of the hand area G3*b*.

As illustrated in FIG. 14, the graphical user interface G includes a medical instrument usage information area G4, which is a pop-up area. In the medical instrument usage information area G4, the current number of times of use/the maximum number of times of use (see FIG. 16) of the medical instrument 4 attached to each arm 60 is displayed in a pop-up. When the current number of uses of the medical instrument becomes equal to the maximum number of uses of the medical instrument, the current number of uses is displayed in red. When an error occurs in the medical instrument 4 attached to any one of the arms 60, error information is displayed in a pop-up manner. When the medical instrument 4 is not attached to the arm 60, nothing is displayed in the medical instrument usage information area G4. The medical instrument usage information area G4 is displayed in an area adjacent above the clutch area G1, the camera area G2, and the hand area G3 on the monitor 24. The medical instrument usage information area G4 is an example of a "surgical instrument usage information area".

As illustrated in FIG. 14, the graphical user interface G includes a level indication area G5. In the level indication area G5, information on the angle of the endoscope 6 is displayed. The level indication area G5 is displayed only while the camera pedal 22*c* is being depressed (stepped). That is, when receiving the command that enables the movement of the endoscope 6, the image processing device 8 displays a level LV (a level indication LV) of the endoscope 6 in the level indication area G5. The level indication area G5 is an example of a "center area".

Figure 17A:
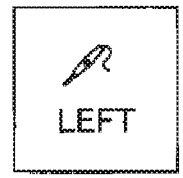
FIGS. 17A, 17B, and 17C are diagrams for explaining a left pop-up area.
Figure 17B:
Figure 17C:
Figure 18:
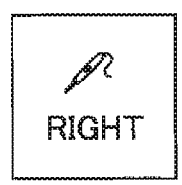
FIG. 18 is a diagram for explaining a right pop-up area.

As illustrated in FIG. 14, the graphical user interface G includes a left pop-up area G6. In the left pop-up area G6, the icons illustrated in FIGS. 17A to 17C are displayed in the hover state, which is a state where the foot of the operator is placed on the foot pedal 22. FIG. 17A illustrates an icon displayed when the foot is placed on the coagulation pedal 22*e*L or the cutting pedal 22*d*L. FIG. 17B illustrates an icon displayed when the foot is placed on the clutch pedal 22*b*. FIG. 17C illustrates an icon displayed when the foot is placed on the camera pedal 22*c*. The left pop-up area G6 is displayed in a left side portion on the monitor 24. The left pop-up area G6 is an example of an "operation pedal area".

As illustrated in FIG. 14, the graphical user interface G includes a right pop-up area G7. In the right pop-up area G7, an icon (FIG. 18) is displayed when the foot is placed on the coagulation pedal 22*e*R or the cutting pedal 22*d*R. The right pop-up area G7 is displayed in a right side portion on the monitor 24. The right pop-up area G7 is an example of an "operation pedal area".

Further, as illustrated in FIG. 14, the graphical user interface G includes the first area G8 that displays the movable range of the arm 60 and the operable range of the operation handle 21 where the operation handle 21 is operable in the movable range of the arm 60. The graphical user interface G also includes a second area G9 that displays a direction in which the operation handle 21 is required to be operated to return the operation handle 21 to the inside of the operable range of the operation handle (toward the center of the operable range of the operation handle) and/or (e.g., "and" in a first embodiment) to return the arm 60 to the inside of the movable range (toward the center of the movable range of the arm 60).

Further, the number of arms 60 that can be operated by the operation handle 21 is two. For example, the operation handle 21L operates the left arm 60L (for example, the arm 60*a*, see FIG. 1) that supports the medical instrument 4, and the operation handle 21. R operates the right arm 60R (for example, the arm 60*d*, see FIG. 1) that supports the medical instrument 4. The first area G8 includes a first area G8L for the left arm 60L and a first area G8R for the right arm 60R, and the second area G9 includes a second area G9L for the left arm 60L and a second area G9R for the right arm 60R. Note that the left arm 60L and the right arm 60R are examples of a "first manipulator" and a "second manipulator."

As illustrated in FIG. 14, the graphical user interface G includes error notification areas G15 (G15*a*, G15*b*) The error notification area G15*a* is displayed in a pop-up to display warning and error information when a warning or an error occurs. The error notification area G15*b* is displayed in a pop-up to display details of notes of the warning and the error displayed in the error notification area G15*a*.

Figure 19:
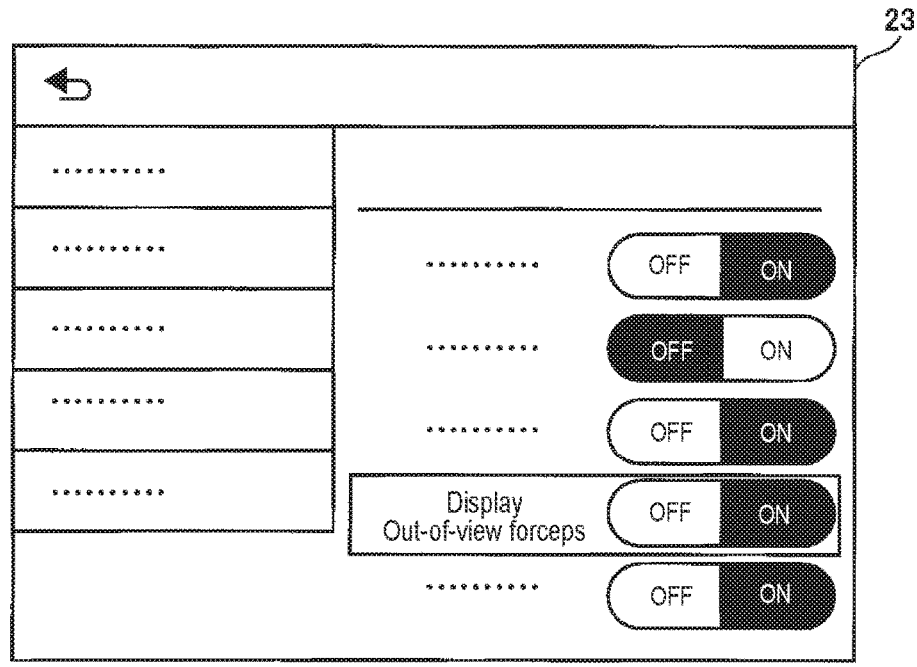
FIG. 19 is a diagram for explaining a display state of a touch panel of a remote control apparatus.

Further, in a first embodiment, the image processing device 8 is configured to switch between a displayable mode and a non-displayable mode, wherein the mark MK1 illustrated in FIG. 13 (also the mark MK2 illustrated in FIG. 25 according to a second embodiment) that corresponds to the medical instrument 4 located outside the field of view of the endoscope 6 is displayable in the displayable mode and is not displayable in the non-displayable mode. Specifically, as illustrated in FIG. 19, in response to operation on the touch panel 23 of the remote control apparatus 2, "ON" and "OFF" buttons for turning on and off an "Out-of-view forceps display" are displayed. In a state where the "ON" for the "Out-of-view forceps display" setting is selected, the image processing device 8 displays, in response to the camera pedal 22*c* being depressed by the operator, the mark MK1 (or the mark MK2 according to a second embodiment) corresponding to the medical instrument 4 that is located outside the field of view of the endoscope 6. In a state where the "OFF" for the "Out-of-view forceps display" setting is selected, the mark MK1 (or the mark MK2 according to a second embodiment) is not displayed. With this configuration, the display setting of the "out-of-view forceps display" can be easily switched based on the skill level of the operator's operation and the needs of the operator.

As illustrated in FIG. 14, the graphical user interface G includes a status area G10. In the status area G10, information such as the remaining amount of the built-in battery of the medical manipulator 1, the brightness/contrast of the monitor 24, the lap time, and the elapsed time of the surgery are displayed. Specifically, as illustrated in FIG. 14, the status area G10 is displayed between the upper end eu of the screen gr and a position below the upper end eu of the screen gr by a length (L11) of one tenth of the vertical length of the screen gr. The status area G10 is an example of a "surgical system area".

Here, in a first embodiment, as illustrated in FIGS. 13 and 14, the image processing device 8 displays, in the monitor 24, the graphical user interface G on the image captured by the endoscope 6 in the overlapped manner, such that the graphical user interface G displays a mark MK1 that indicates the medical instrument 4 that is located outside the field of view of the endoscope 6. The mark MK1 (the graphical user interface G) is displayed, when the image processing device 8 receives the command that enables the movement of the endoscope 6 (when the camera pedal 22c is being depressed (stepped) by the operator) and any one of the medical instruments 4 (any one of the medical instruments 4 attached to the arms 60a, 60b, and 60d) is located outside the field of view of the endoscope 6. The mark MK1 (the graphical user interface G) is displayed in a neighborhood area G11 in the vicinity of the outer edge of the level indication area G5, wherein the level indication area G5 includes the center portion CN1 of the screen gr of the monitor 24 and does not include the vicinity of the edge e (eu, ed, el, and er) of the monitor screen gr (that is, the level indication area G5 does not include an edge neighborhood portion (or a peripheral portion) of the monitor screen gr inside and in the vicinity of the edge e (eu, ed, el, and er) of the monitor screen gr). Note that the neighborhood area G11 is an area located outside the level LV and in the vicinity of the level LV.

Note that the image processing device 8 acquires the position of the medical instrument 4 based on the posture and the position of the arm 60 to which the medical instrument 4 is attached. Further, the image processing device 8 acquires the imaging direction of the endoscope 6 based on the posture and the position of the arm 60 to which the endoscope 6 is attached. Further, the image processing device 8 acquires the field angle (field of view range) of the endoscope 6 based on the zoom state of the endoscope 6. The image processing device 8 obtains the field angle (field of view range) of the endoscope 6 with reference to values of the mechanical system (lens, etc.) of the endoscope 6. Then, the image processing device 8 obtains the coordinates of the distal end of each of the medical instruments 4 with respect to the field of view of the endoscope 6, based on the information on the field of view of the endoscope 6, the posture and the position of the endoscope 6, and the positions of the arms 60. With this, the image processing device 8 determines whether each of the medical instruments 4 is located outside the field of view of the endoscope 6 or not.

In the example illustrated in FIGS. 13 and 14, the medical instruments 4 (the medical instruments 4 such as the forceps 4b other than the endoscope 6) are respectively attached to the arm 60a (corresponding to the hand area G3a having the identification number "4"), the arm 60b (corresponding to the hand area G3b having the identification number "3"), the arm 60d (corresponding to the hand area G3c having the identification number "1") among the arms 60a, 60b, 60c, and 60d. The endoscope 6 is attached to the arm 60c (corresponding to the camera area G2 having the identification number "2"). In an example illustrated in FIG. 13, the arm 60a (corresponding to the hand area G3a having the identification number "4") and the arm 60d (corresponding to the hand area G3c having the identification number "1") are in the active states in which the arm 60a and 60d are allowed to be operated by the operation handle(s) 21, and the hand areas G3a and G3c corresponding to these arms 60a and 60d are displayed in dark gray. To the contrary, the arm 60b is in the inactive state in which the arm 60b is not allowed to be operated by the operation handle(s) 21, and the hand area G3b corresponding the arm 60b is displayed in light gray.

An example illustrated in FIG. 13, the medical instrument 4 attached to the arm 60a (corresponding to the hand area G3a having the identification number "4") and the medical instrument 4 attached to the arm 60d (corresponding to the hand area G3c having the identification number "1") are located in the field of view of the endoscope 6. To the contrary, the medical instrument 4 attached to the arm 60b (corresponding to the hand area G3b having the identification number "3") is located outside the field of view of the endoscope 6.

In a first embodiment, as illustrated in FIG. 13, the graphical interface G is configured to display the mark MK1 that indicates the medical instrument 4 that is located outside the field of view of the endoscope 6, at the area G12 (see FIG. 20), in the neighborhood area G11, that is deviated from the center CN2 of the level indication area G5 in the direction in which the medical instrument 4 is deviated from the field of view of the endoscope 6. In FIG. 13, the mark MK1 (the letter of the number "3") is displayed.

Figure 20:
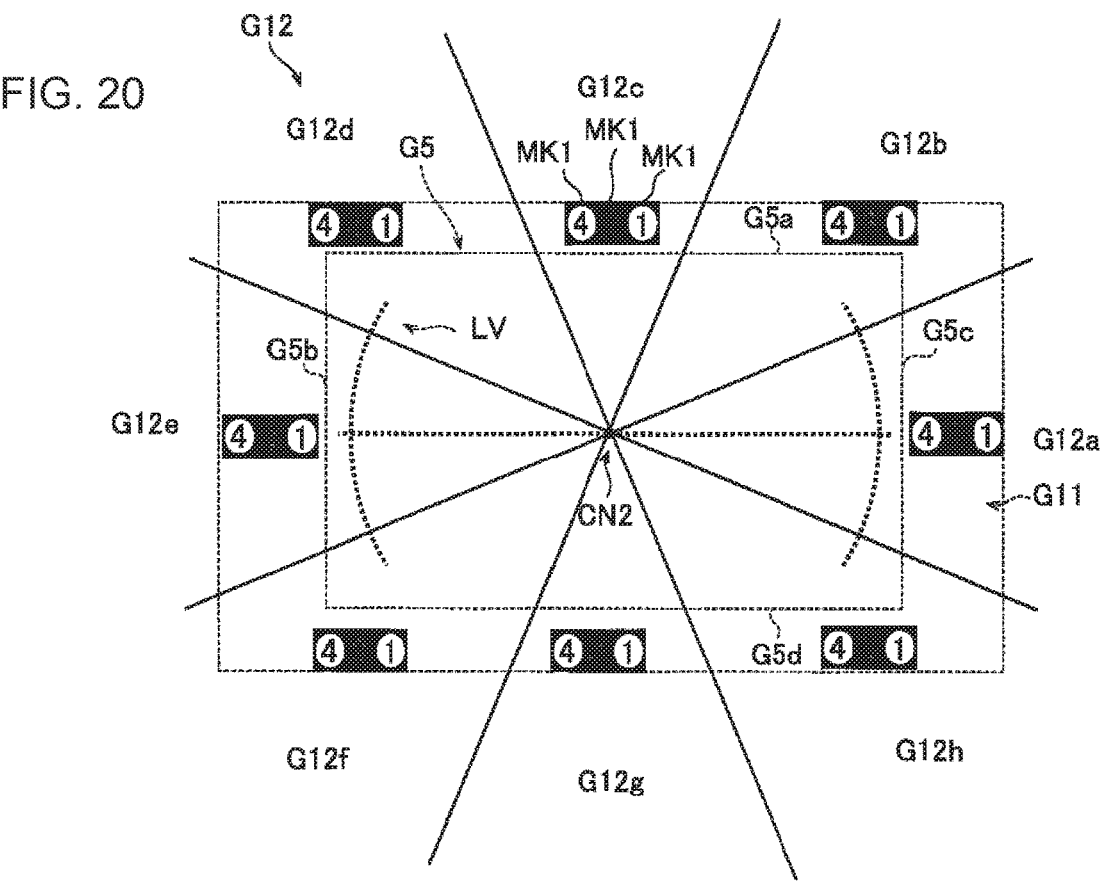
FIG. 20 is a diagram for explaining examples of marks according to a first embodiment.

In a first embodiment, as illustrated in FIG. 20, the area G12 that displays the mark MK1 indicating (corresponding to) the medical instrument 4 that is located outside the field of view of the endoscope 6 is one of the areas G12 into which the neighborhood area G11 is divided by radially extending lines centered on the center CN2 of the level indication area G5. In a first embodiment, the neighborhood area G11 is radially divided into eight areas G12a to G12h by the radial lines radially extending from the center CN2 of the level indication area G5. The eight areas G12a to G12h are arranged at intervals of 45 degrees about the center CN2. In FIG. 13, the mark MK1 (the letter of the number "3") is displayed in the area G12d (see FIG. 20), as an example. Note that FIG. 20 illustrates all of display patterns, in which a pair of the marks MK1 having the identification numbers "1" and "4", which indicates the medical instruments 4 corresponding to the identification numbers "1" and "4" are located outside the field of view of the endoscope 6, is displayed in each one of the areas G12a, G12b, G12, G12d, G12e, G12f, G12g, and G12h.

In a first embodiment, as illustrated in FIG. 14, when receiving the command that enables the movement of the endoscope 6, the image processing device 8 displays the level LV of the endoscope 6 in the level indication area G5. The image processing device 8 displays, on the monitor 24, the graphical user interface G to display the mark MK1 in the neighborhood area G11 in the vicinity of the outer edge of the level indication area G5. The level LV indicates the inclination of the field of view of the endoscope 6 with respect to the patient P. The level LV is displayed when the image processing device 8 receives the command that enables the movement of the endoscope 6 (when the camera pedal 22c is operated, e.g., is depressed).

In a first embodiment, as illustrated in FIG. 14, the level indication area G5 is a rectangular area (a rectangular shape elongated in the lateral direction) including the upper side G5a, the left side G5b, the right side G5c, and the lower side G5d thereof. In this way, the visibility of the operator can be improved by displaying the mark MK1 in the neighborhood area G11 in the vicinity of the level indication area G5 having a predetermined size including the center portion of the screen gr. The upper side G5a of the level indication area G5 is provided between a position upper from the center CN1 of the screen gr of the monitor 24 by the length L11 of one tenth of the vertical length of the screen gr and a position lower from the upper edge eu of the screen gr by the length L11 of one tenth of the vertical length of the screen gr. It may be preferable that the upper side G5a of the level indication area G5 is provided between a position upper from the center CN1 of the screen gr by a length of one eighth of the vertical length of the screen gr and a position lower from the upper edge eu of the screen by the length of one eighth of the vertical length of the screen gr. It may be more preferable that the upper side G5a of the level indication area G5 is provided between a position upper from the center CN1 of the screen gr by a length of one sixth of the vertical length of the screen gr and a position lower from the upper edge eu of the screen by the length of one sixth of the vertical length of the screen gr.

The upper side G5a of the level indication area G5 is provided a position lower than the status area G10 that displays the remaining battery level of the built-in battery of the medical manipulator 1, or the like.

The left side G5b of the level indication area G5 is provided between a position left from the center CN1 of the screen gr of the monitor 24 by the length L12 of one tenth of the horizontal length of the screen gr, and a position right from the left end el of the screen gr by the length L12. It may be preferable that the left side G5b of the level indication area G5 is provided between a position left from the center CN1 of the screen gr of the monitor 24 by a length of one eighth of the horizontal length of the screen gr and a position right from the left end el of the screen gr by the length of one eighth of the horizontal length of the screen gr. It may be more preferable that the left side G5b of the level indication area G5 is provided between a position left from the center CN1 of the screen gr of the monitor 24 by a length of one sixth of the horizontal length of the screen gr and a position right from the left end el of the screen gr by the length of one sixth of the horizontal length of the screen gr.

The right side G5c of the level indication area G5 is provided between a position right from the center CN1 of the screen gr of the monitor 24 by the length L12 of one tenth of the horizontal length of the screen gr and a position left from the right end er of the screen gr by the length L12 of one tenth of the horizontal length of the screen gr. It may be preferable that the right side G5c of the level indication area G5 is provided between a position right from the center CN1 of the screen gr of the monitor 24 by a length of one eighth of the horizontal length of the screen gr and a position left from the right end er of the screen gr by the length of one eight of the horizontal length of the screen gr. It may be more preferable that the right side G5c of the level indication area G5 is provided between a position right from the center CN1 of the screen gr of the monitor 24 by a length of one sixth of the horizontal length of the screen gr and a position left from the right end er of the screen gr by the length of one sixth of the horizontal length of the screen gr.

The lower side G5d of the level indication area G5 is provided between a position lower from the center CN1 of the screen gr of the monitor 24 by the length L11 of one tenth of the vertical length of the screen gr and a position upper from the lower end ed of the screen by the length L11 of one tenth of the vertical length of the screen gr. It may be preferable that the lower side G5d of the level indication area G5 is provided between a position lower from the center CN1 of the screen gr of the monitor 24 by a length of one eighth of the vertical length of the screen gr and a position upper from the lower end ed of the screen by the length of one eighth of the vertical length of the screen gr. It may be more preferable that the lower side G5d of the level indication area G5 is provided between a position lower from the center CN1 of the screen gr of the monitor 24 by a length of one sixth of the vertical length of the screen gr and a position upper from the lower end ed of the screen by the length of one sixth of the vertical length of the screen gr.

In a first embodiment, the lower end G5d of the level indication area G5 is provided above the hand area G3a, the hand area G3b, the hand area G3c, and the camera area G2. Further, the lower end G5d of the level indication area G5 is provided above the medical instrument usage information area G4.

Note that the center CN1 of the screen gr of the monitor 24 and the center CN2 of the level indication area G5 are provided at positions substantially same as each other.

Further, in a first embodiment, the mark MK1 indicating the medical instrument 4 that is located outside the field of view is displayed in an area between the level indication area G5 and at least one (e.g., "all" in a first embodiment) of the medical instrument usage information area G4, the left pop-up area G6, the right pop-up area G7, and the status area G10. Note that the medical instrument usage information area G4 indicates the usage information of each medical instrument 4. The left pop-up area G6 is displayed when the foot pedal 22 is operated (that is, in the hover state where the foot is placed on the foot pedal 22). The right pop-up area G7 is displayed when the coagulation pedal 22eR or the cutting pedal 22dR is operated (that is, when the foot is placed on the coagulation pedal 22eR or the cutting pedal 22dR). The status area G10 displays the status of the surgical system 400.

In a first embodiment, as illustrated in FIG. 13, the mark MK1 includes the identification number to identify the arm 60 that supports the medical instrument 4 that is located outside the field of view of the endoscope 6. In an example illustrated in FIG. 13, the letter of the number "3" serving as the mark MK1 is displayed indicating that the medical instrument 4 attached to the arm 60b (corresponding to the hand area G3a having the identification number "3") is located outside the field of view of the endoscope 6.

Figure 21:
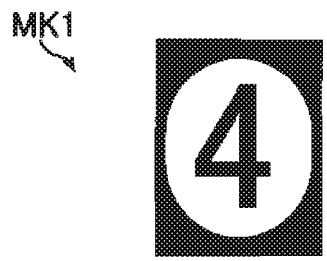
FIG. 21 is a diagram for explaining an example of a mark (for an operation target) according to a first embodiment.
Figure 22:
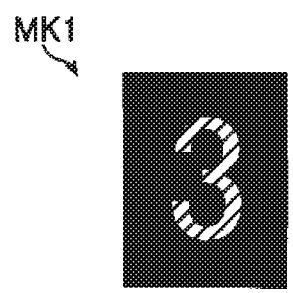
FIG. 22 is a diagram for explaining an example of a mark (for a non-operation target) according to a first embodiment.

Further, in a first embodiment, as illustrated in FIGS. 21 and 22, the mark MK1 is displayed in different manners depending on whether the medical instrument 4 located outside the field of view is an operation target or not. Specifically, as illustrated in FIG. 21, when the medical instrument 4 attached to the arm 60 is an operation target, the mark MK1 is displayed, which is the black-colored identification number (any of 1 to 4) of the arm 60 in a white oval in a black square. To the contrary, as illustrated in FIG. 22, when the medical instrument 4 attached to the arm 60 is not an operation target, the mark MK1 is displayed, which is the gray-colored identification number (any of 1 to 4) of the arm 60 in a black square.

Further, in a first embodiment, as illustrated in FIG. 20, when two or more of the medical instruments 4 among the medical instrument 4 attached to the arm 60a, the medical instrument 4 attached to the arm 60b, and the medical instrument 4 attached to the arm 60d are located outside the field of view of the endoscope 6, two or more of the marks MK1 corresponding to the medical instruments 4 that are located outside the field of view of the endoscope 6 are displayed so as to correspond to the order of the arrangement positions of the arm 60a, the arm 60b, and the arm 60d. The order of the arrangement positions of the arm 60a, the arm 60b, and the arm 60d means the order of the positions of the arm 60a, the arm 60b, and the arm 60d in the state where the arm 60a, the arm 60b, and the arm 60d are attached to the arm base 50.

Further, in a first embodiment, as illustrated in FIG. 20, when all of the medical instruments 4 attached to the arm 60a, 60b, and 60d are located outside the field of view of the endoscope 6, the mark MK1 having the identification number "4" corresponding to the arm 60a, the mark MK1 having the identification number "3" corresponding to the arm 60b, and the mark MK1 having the identification number "1" corresponding to the arm 60d are displayed in that order so as to corresponding to the order of the arrangement positions of the arms 60a, 60b, and 60d. That is, the mark MK1 having the identification number "4", the mark MK1 having the identification number "3", and the mark MK1 having the identification number "1" are displayed in the arrangement order of the hand area G3a having identification number "4", the hand area G3b having identification number "3", and the hand area G3c having identification number "1".

Figure 23:
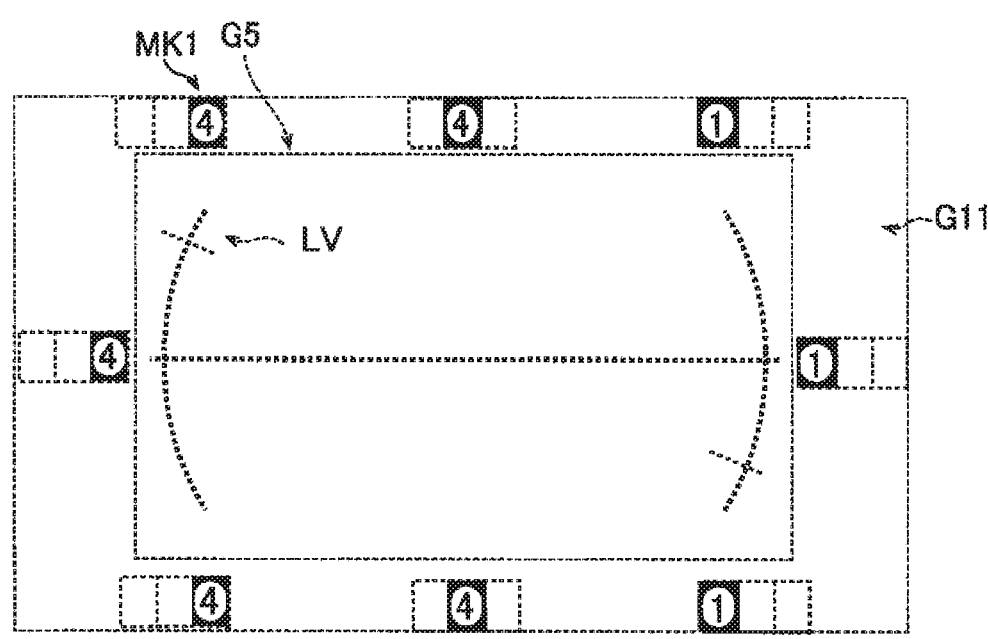
FIG. 23 is a diagram for explaining examples of marks displayed so as to be shifted toward a center according to a first embodiment.

Further, in a first embodiment, as illustrated in FIG. 23, when one or two of the medical instruments 4 attached to the arms 60a, 60b, and 60d are located outside the field of view of the endoscope 6, the mark(s) MK1 corresponding the one or two medical instruments 4 located outside the field of view of the endoscope 6 are displayed at the positions shifted toward the center of the screen gr of the monitor 24 than those in the state where all the marks MK1 are displayed. For example, when only the medical instrument 4 attached to the arm 60a is located outside the field of view of the endoscope 6 and on the left side of the field of view of the endoscope 6, the mark MK1 having the identification number "4" corresponding to the medical instrument 4 attached to the arm 60a is displayed so as to be arranged closer to (shifted toward) the center of the screen gr than a position of the mark MK1 having identification number "4" in the state where all the three marks MK1 having identification numbers "4", "3", and "1" are displayed (see FIG. 20).

Similarly, when only the medical instrument 4 attached to the arm 60a is located outside and on the lower side of the field of view of the endoscope 6, the mark MK1 having the identification number "4" corresponding to the medical instrument 4 attached to the arm 60a is displayed so as to be arranged closer to the center of the screen gr than a position of the mark MK1 having identification number "4" in the state where all the three marks MK1 having identification numbers "4", "3", and "1" are displayed (see FIG. 20). The same applies when only the medical instrument 4 attached to the arm 60a is located outside and on the upper side (diagonally upper left side, diagonally lower left side) of the field of view of the endoscope 6.

Similarly, when only the medical instrument 4 attached to the arm 60d is located outside and on the right side of the field of view of the endoscope 6, the mark MK1 having the identification number "1" corresponding to the medical instrument 4 attached to the arm 60d is displayed so as to be arranged closer to the center of the screen gr than a position of the mark MK1 having identification number "1" in the state where all the three marks MK1 having identification numbers "4", "3", and "1" are displayed (see FIG. 20). The same applies when only the medical instrument 4 attached to the arm 60d is located outside and on the left side (the diagonally upper left side, the diagonally lower left side) of the field of view of the endoscope 6.

(Display Method)

Figure 24:
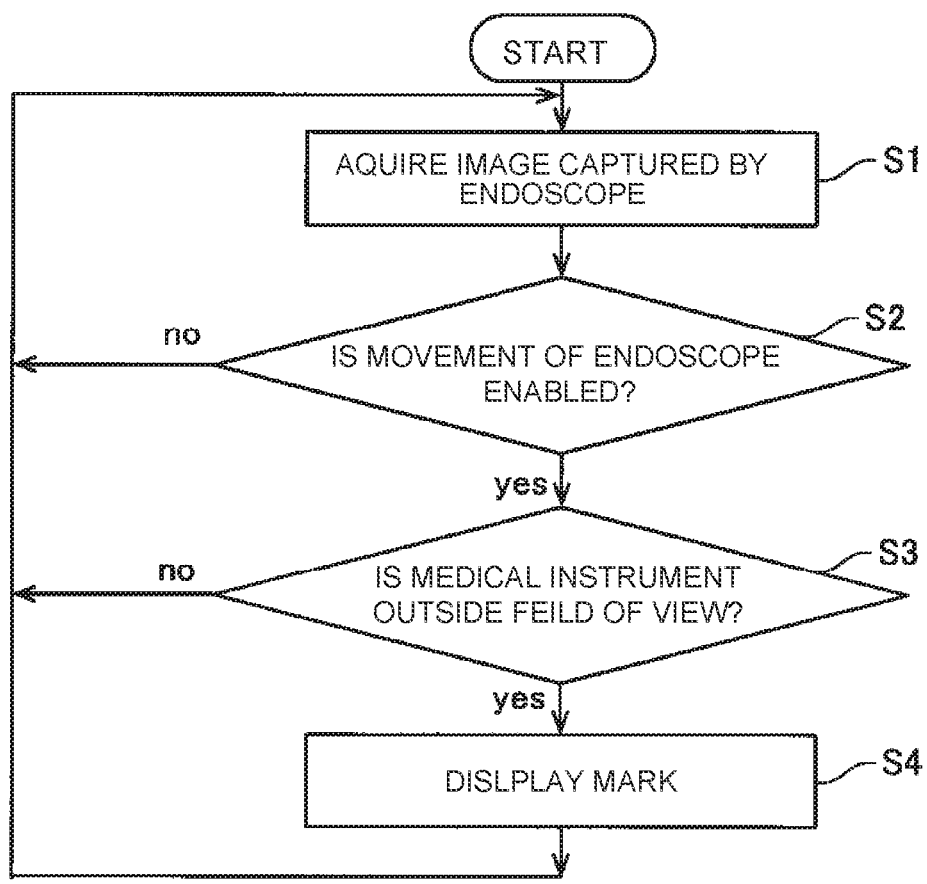
FIG. 24 is a flowchart for explaining a display method according to a first embodiment.

Next, with reference to FIG. 24, a method of displaying the graphical user interface G on the monitor 24 in the surgical operation system 100 is described. Note that the graphic user interface G is generated by the image processing device 8.

First, in step S1, the image processing device 8 acquires the image captured by the endoscope 6 configured to acquire the image of the surgical site.

In step S2, the image processing device 8 determines whether the command that enables the endoscope 6 to move is received (whether the camera pedal 22c is depressed by the operator). In the case of "Yes" in step S2, the process proceeds to step S3. In the case of "No" in step S2, the process returns to step S1.

Next, in step S3, the image processing device 8 determines whether at least one (any one) of the medical instruments 4 attached to the arms 60a, 60b, and 60d is located outside the field of view of the endoscope 6. In the case of "Yes" in step S3 (that is, in the case where the command that enables the movements of the endoscope 6 is received and at least one of the medical instruments 4 that are attached to the arms 60 is located outside the field of view of the endoscope 6), the process proceeds to step S4. In the case of "No" in step S4, the process returns to step S1.

Next, in step S4, the image processing device 8 displays, on the screen gr of the monitor 24, the graphical user interface G on the image captured by the endoscope 6 in the overlapped manner, such that the graphical user interface G displays, at the neighborhood area G11 in the vicinity of the outer edge of the level indication area G5, the mark MK1 indicating the medical instrument 4 that is located outside the field of view of the endoscope 6, wherein the level indication area G5 includes the center CN1 of the monitor screen gr and does not include the vicinity of the edge e of the monitor screen gr.

The operations of steps S1 to S4 described above are always performed during the operation of the surgical operation system 100.

Effects of First Embodiment

In a first embodiment, the following effects can be obtained.

In a first embodiment, the image processing device 8 displays, on the screen gr of the monitor 24, the graphical user interface G on the image captured by the endoscope 6 in the overlapped manner, such that the graphical user interface G displays, in the neighborhood area G11 in the vicinity of the outer edge of the level indication area G5, the mark MK1 indicating the medical instrument that is located outside the field of view of the endoscope 6, wherein the level indication area G5 is displayed at the central region of the monitor screen gr and includes the center CN1 of the monitor screen gr and does not include the vicinity of the edge e (eu, ed, el, and er) of the monitor screen gr. Accordingly, the mark MK1 indicating the medical instrument 4 that is located outside the field of view of the endoscope 6 is displayed at the position closer to the center of the screen gr of the monitor 24 than the vicinity of the edge e of the monitor screen gr is. As a result, the operator can easily visually recognize the mark MK1 indicating the medical instrument 4 that is located outside the field of view of the endoscope 6 without significantly moving the line of sight.

In a first embodiment, the graphical interface G is configured to display the mark MK1 indicating the medical instrument 4 that is located outside the field of view of the endoscope 6, in one of the areas G12, in the neighborhood area G11 in the vicinity of the outer edge of the level indication area G5, that is deviated from the center CN2 of the level indication area G5 in the direction in which the medical instrument 4 is deviated from the field of view of the endoscope 6. With this configuration, the mark MK1 is located in the vicinity of the level indication area G5 and displaced from the center CN2 of the level indication area G5 in the direction in which the medical instrument 4 is displaced from the field of view of the endoscope 6. Therefore, the operator can easily recognize the displaced direction in which the medical instrument 4 outside the field of view of the endoscope 6 is displaced from the field of view of the endoscope 6 without significantly moving the line of sight from the level indication area G5. Further, since the position of the mark MK1 relative to the center CN2 of the level indication area G5 in the screen gr of the monitor 24 corresponds to the position of the medical instrument 4 that is located outside the field of view of the endoscope 6 relative to the field of view of the endoscope 6, the operator can intuitively and easily recognize the position (the displaced direction) of the medical instrument 4 located outside the field of view of the endoscope 6.

In a first embodiment, as described above, the area G12 that displays the mark MK1 indicating the medical instrument 4 located outside the field of view of the endoscope 6 is one of the areas G12 (G12a to G12h) into which the neighborhood area G11 is divided by lines radially extending from the center CN2 of the level indication area G5. With this configuration, since the plural areas G12 are radially arranged from the center CN2 of the level indication area G5 (that is, the plural areas G12 are circumferentially arranged around the center CN2 of the level indication area G5), the position of the medical instrument 4 located outside the field of view can be more intuitively recognized, unlike a case where the plural areas G12 are provided in only one region in the screen gr of the monitor 24.

Further, in a first embodiment, as described above, when receiving the command that enables the movement of the endoscope 6, the image processing device 8 displays, on the monitor 24, the level LV of the endoscope 6 in the level indication area G5 and the graphical user interface G that displays the mark MK1 outside the level LV. With this configuration, while the operator is visually recognizing the level LV of the endoscope 6 in order to operate (move) the endoscope 6, the mark MK1 indicating the medical instrument 4 located outside the field of view is displayed together with the level LV. Accordingly, the operator can more easily recognize the mark MK1.

Further, in a first embodiment, as described above, the mark MK1 indicating the medical instrument 4 that is located outside the field of view is displayed in an area between the level indication area G5 and at least one of the medical instrument usage information area G4, the left pop-up area G6, the right pop-up area G7, and the status area G10. With this configuration, the mark MK1 is displayed closer to the center of the screen than the at least one of the medical instrument usage information area G4, the left pop-up area G6, the right pop-up area G7, and the status area G10. Therefore, unlike the case where the mark MK1 is arranged at the edge portion e of the screen gr, the visibility of the mark MK1 can be improved.

Further, in a first embodiment, the level indication area G5 has the rectangular shape having the upper side G5a, the left side G5b, the right side G5c, and the lower side G5d thereof, in such a manner that the upper side G5a of the rectangular level indication area G5 is located closer to the upper end eu of the screen gr of the monitor 24 than the center CN1 of the screen gr of the monitor 24 is, the left side G5b of the rectangular level indication area G5 is located closer to the left end el of the screen gr than the center CN1 of the screen gr is, the right side G5c of the rectangular level indication area G5 is located closer to the right end er of the screen gr than the center CN1 of the screen gr is, and the lower side G5d of the rectangular level indication area G5 is located closer to the lower end ed of the screen gr than the center CN1 of the screen gr is. That is, the mark MK1 is displayed in the neighborhood area G11 in the vicinity of the outer edge of the level indication area G5, so that the mark MK1 is not displayed in the center portion of the screen gr of the monitor 24. Therefore, it is possible to prevent the mark MK1 from hindering the operator from visually recognizing the center portion of the screen gr of the monitor 24.

Further in a first embodiment, as described above, the upper side G5a of the level indication area G5 is provided between a position upper from the center CN1 of the screen gr of the monitor 24 by the length L11, which is one tenth of the vertical length of the screen gr, and a position lower from the upper edge eu of the screen gr by the length L11. The left side G5b of the level indication area G5 is provided between a position left from the center CN1 of the screen gr of the monitor 24 by the length L12, which is one tenth of the horizontal length of the screen gr, and a position right from the left end el of the screen gr by the length L12. The right side G5c of the level indication area G5 is provided between a position right from the center CN1 of the screen gr of the monitor 24 by the length L12, which is one tenth of the horizontal length of the screen gr, and a position left from the right end er of the screen gr by the length L12. The lower side G5d of the level indication area G5 is provided between a position lower from the center CN1 of the screen gr of the monitor 24 by the length L11, which is one tenth of the vertical length of the screen gr, and a position upper from the lower end ed of the screen by the length L11. Accordingly, the mark MK1 displayed in the neighborhood area G11 in the vicinity of the outer edge of the level indication area G5 is located closer to the center of the screen gr from the edge portion e of the screen gr. Therefore, unlike the case where the mark MK1 is arranged at the edge portion e of the screen gr, the visibility of the mark MK1 can be improved.

Further in a first embodiment, in order to further improve the visibility of the mark MK1, (i) the upper side G5a of the level indication area G5 is provided between a position upper from the center CN1 of the screen gr of the monitor 24 by a length of one eighth of the vertical length of the screen gr and a position lower from the upper edge eu of the screen gr by the length of one eighth of the vertical length of the screen gr, (ii) the left side G5b of the level indication area G5 is provided between a position left from the center CN1 of the screen gr of the monitor 24 by a length of one eighth of the horizontal length of the screen gr and a position right from the left end el of the screen gr by the length of one eighth of the horizontal length of the screen gr, (iii) the right side G5c of the level indication area G5 is provided between a position right from the center CN1 of the screen gr of the monitor 24 by the length of one eighth of the horizontal length of the screen gr and a position left from the right end er of the screen gr by the length of one eighth of the horizontal length of the screen gr, and (iv) the lower side G5d of the level indication area G5 is provided between a position lower from the center CN1 of the screen gr of the monitor 24 by the length of one eighth of the vertical length of the screen gr and a position upper from the lower end ed of the screen by the length of one eighth of the vertical length of the screen gr.

Further in a first embodiment, as described above, the plurality of arms 60 includes the arm 60b that supports the medical instrument 4 for replacement that is not an operation target, and the graphical user interface G displays, at an edge neighborhood area in the vicinity of the lower end ed of the screen gr of the monitor 24, the hand area G3a that indicates the information regarding the medical instrument 4 supported by the arm 60d, the hand area G3b that indicates the information regarding the medical instrument 4 supported by the arm 60b, the hand area G3c that indicates the information regarding the medical instrument 4 supported by the arm 60a, and the camera area G2 that indicates the information regarding the endoscope 6. With this configuration, the mark MK1 is displayed closer to the center of the screen gr than the hand areas G3a, G3b, and G3c and the camera area G2 are. Thus, the visibility of the mark MK1 can be further improved.

Further in a first embodiment, as described above, the level indication area G5 is the rectangular area having the upper side G5a, the left side G5b, the right side G5c, and the lower side G5d thereof and the lower side G5d of the level indication area G5 is located upper than the hand areas G3a, G3b, and G3c and the camera area G2. With this configuration, the mark MK1 is located at a position upper than that in a case where the lower end G5d of the level indication area G5 is provided at the lower end ed of the screen gr. Therefore, the mark MK1 can be visually recognized while suppressing the downward movement of the line of sight of the operator.

Further, in a first embodiment, as described above, when two or more of the medical instruments 4 attached to the arms 60a, 60b and 60d are located outside the field of view of the endoscope 6, the marks MK1 corresponding to the two or more of the medical instruments 4 located outside the field of view of the endoscope 6 are displayed so as to be arranged in the order corresponding to the arrangement order of the arms 60a, 60b and 60d to which the two of more of the medical instruments 4 are attached. With this configuration, the operator O can easily recognize the arrangement order of the medical instruments 4 that are located outside the field of view of the endoscope 6.

Further, in a first embodiment, as described above, the image processing device 8 is configured to switch between the displayable mode in which the marks MK1 are displayable and the non-displayable mode in which the marks MK1 are not displayable. As a result, it is possible to switch between the displayable mode in which the marks MK1 are displayable and the non-displayable mode in which marks MK2 are not displayable, as needed.

Further, in a first embodiment, as described above, when all the medical instruments 4 are located outside the field of view of the endoscope 6, the marks MK1 corresponding to all the medical instruments 4 are displayed in the order of the arrangement positions of the arms 60 that supports all the medical instruments 4. When one or two of the medical instruments 4 are located outside the field of view of the endoscope 6, one or two of the marks MK1 corresponding to the one or two of the medical instruments 4 are displayed at the positions closer to the center of the screen g than those in the state where all the marks MK1 are displayed. With this configuration, since the one or two marks MK1 are displayed closer to the center of the screen g, the visibility thereof can be further improved.

Further, in a first embodiment, as described above, the remote control apparatus 2 includes the camera pedal 22c for inputting the command that enables the endoscope 6 to move, and the endoscope 6 is configured to be moved according to both of the operation handle 21. R and operation handle 21. L being moved together while the camera pedal 22c is being depressed to output the command that enables the endoscope 6 to move. Thus, the operator O can easily move the endoscope 6 by operating the camera pedal 22c.

Further, in a first embodiment, as described above, the mark MK1 is displayed in different manners depending on whether the medical instrument 4 located outside the field of view is an operation target or not. With this configuration, the operator O can easily recognize whether or not the medical instrument 4 that is located outside the field of view of the endoscope 6 is an operation target.

In a first embodiment, as described above, the mark MK1 includes the number that identifies the arm 60 that supports the medical instrument 4 that is located outside the field of view of the endoscope 6. With this configuration, the operator O can easily identify the medical instrument 4 that is located outside the field of view of the endoscope 6.

Second Embodiment

Figure 25:
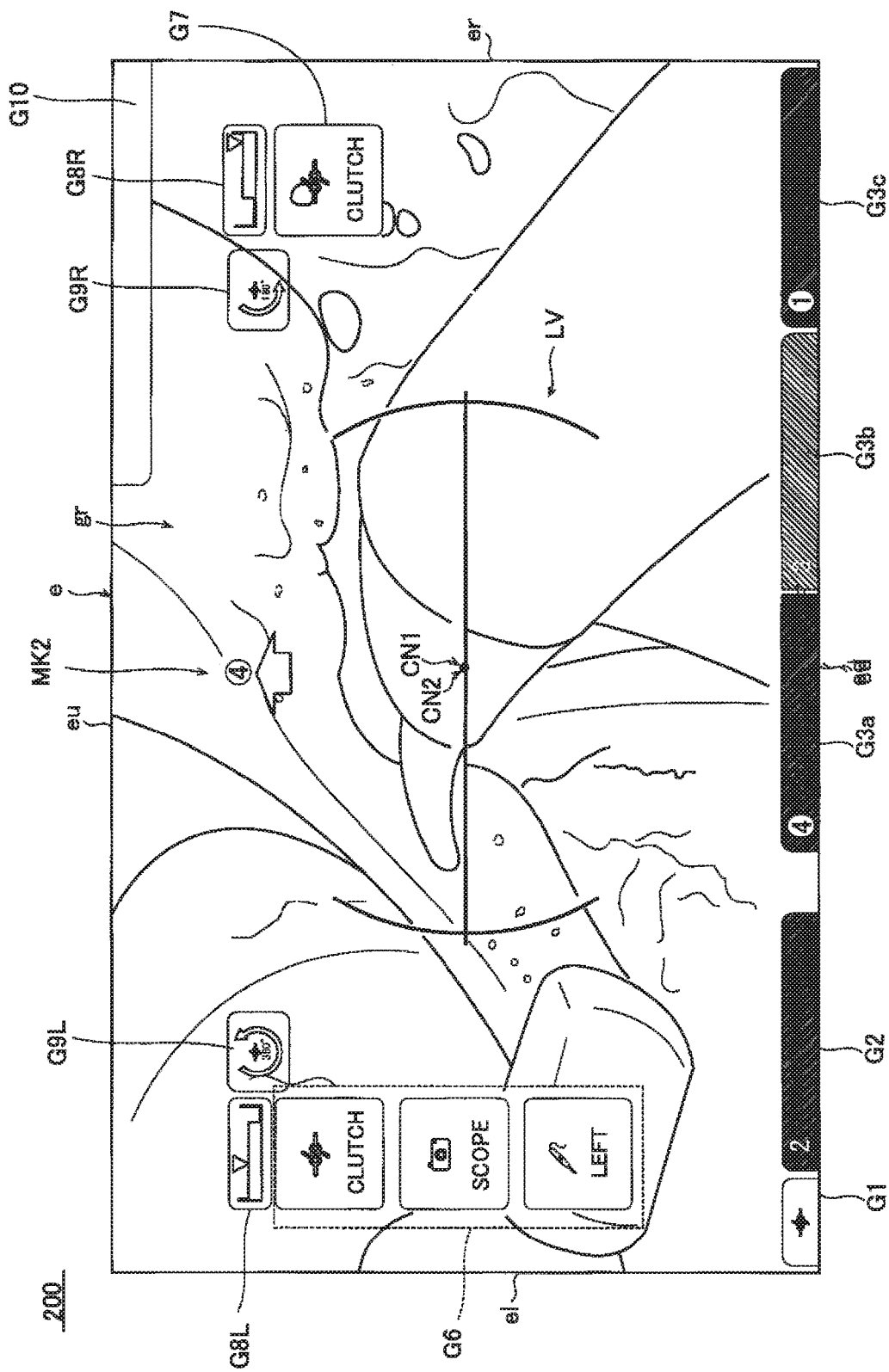
FIG. 25 is a diagram for explaining a graphical user interface including a mark on an image captured by an endoscope according to a second embodiment.
Figure 26:
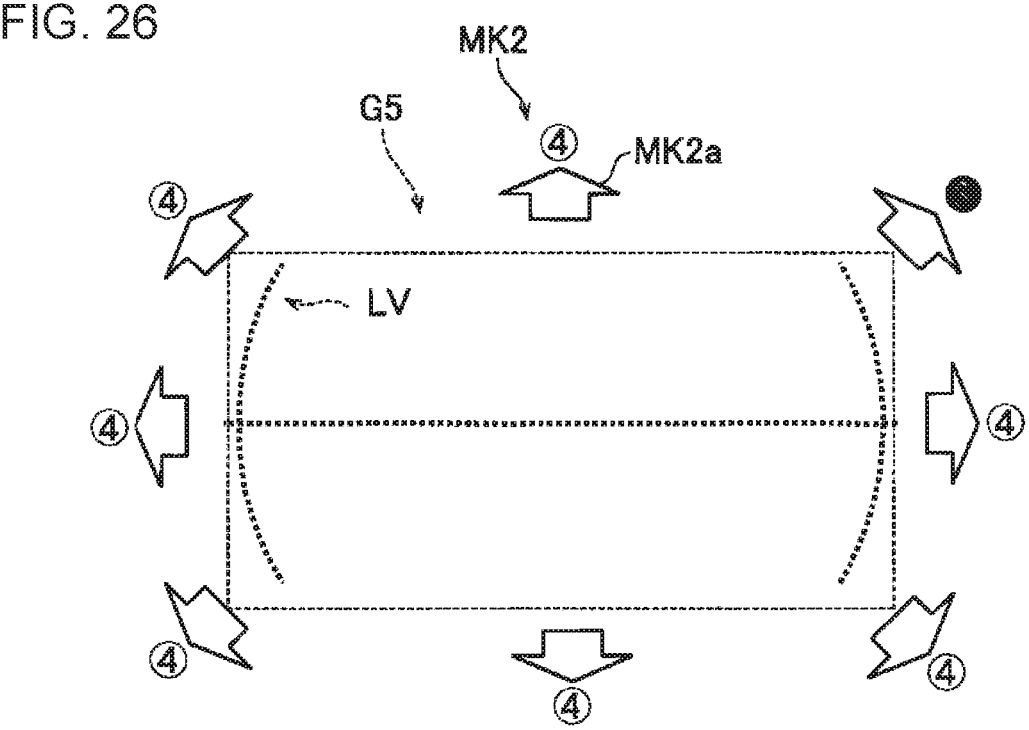
FIG. 26 is a diagram for explaining examples of marks according to a second embodiment.
Figure 27:
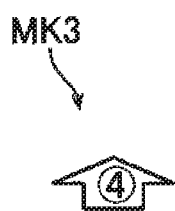
FIG. 27 is a diagram for explaining an example of a mark according to a second embodiment.

With reference to FIGS. 25 to 27, a configuration of a surgical operation system 200 according to a second embodiment is described.

In a second embodiment, as illustrated in FIGS. 25 and 26, a mark MK2 includes an arrow MK2a that indicates a direction in which the medical instrument 4 that is located outside the field of view of the endoscope 6 is deviated from the field of view of the endoscope 6. Specifically, the identification number (for example, "4") of the medical instrument 4 that is located outside the field of view of the endoscope 6 is displayed at a position in the vicinity of the arrow MK2a and on the outer side of the arrow MK2a. Note that the identification number may be displayed in the arrow MK2a, like a mark MK3 such as being illustrated in FIG. 27. The inside of the arrow MK2a is displayed as transparent or translucent so that the image captured by the endoscope can be seen through the arrow MK2a. When the medical instrument 4 is an operation target, the identification number in the mark MK2 corresponding to the target medical instrument 4 is displayed in black color in a white circle (see the number "4" in FIG. 25). When the medical instrument 4 is not an operation target, the identification number in the mark MK2 corresponding to the non-target medical instrument 4 is displayed in gray color in a black circle (see the identification number "3" in FIG. 26). The arrow MK2a is two-dimensionally displayed.

Effects of Second Embodiment

In a second embodiment, the following effects can be obtained.

In a second embodiment, as described above, the mark MK2 includes the arrow MK2a that indicates the direction in which the medical instrument 4 that is located outside the field of view of the endoscope 6 is deviated from the field of view of the endoscope 6. With this configuration, the operator O can intuitively recognize the direction in which the medical instrument 4 that is located outside the field of view of the endoscope 6 is displaced from the field of view of the endoscope 6.

[Modifications]

Note that one or more embodiments disclosed herein should be considered as exemplary in all respects and do not limit the invention. The scope of the invention is indicated by claims, not by explanation of one or more embodiments described above, and includes equivalents to the claims and all alterations (modification) within the same.

For example, in first and second embodiments described above, the case has been described in which the image processing device 8 acquires the image from the endoscope 6 and generates the graphical user interface G. However, the invention is not limited thereto. For example, in a modification, the control unit 31 of the medical manipulator 1, a control unit (not illustrated) of the remote control apparatus 2, or the like may generate the graphical user interface G. Further, in a modification, an image processing device that acquires the image from the endoscope 6 and an image processing device that generates a graphical user interface G to be superimposed on the image acquired from the endoscope 6 may be separately provided.

Further, in first and second embodiments described above, the case has been described in which the mark MK1 is displayed in one of the areas G12 that is deviated from the center CN2 of the level indication area G5 in the direction in which the medical instrument 4 is deviated from the field of view of the endoscope 6. However, the invention is not limited thereto. For example, in a modification, the mark MK2 may be displayed at a fixed position in the neighborhood area G11 in the vicinity of the outer edge of the level indication area G5.

In first and second embodiments described above, the case has been described in which one of the eight areas G12, into which the neighborhood area G11 is divided by radially extending lines centered on the center CN2 of the level indication area G5, is used as the area G12 that displays the mark MK1. However, the invention is not limited thereto. For example, in a modification, the number of the divided areas G12 may be a number other than eight.

Further, in first and second embodiments described above, the case has been described in which the mark MK1 is displayed outside the level indication area G5. However, the invention is not limited thereto. For example, in a modification, the mark MK1 may be displayed in the level indication area G5.

Further, in first and second embodiments described above, the case has been described in which the level indication area G5 has the rectangular shape. However, the invention is not limited thereto. For example, in a modification, the level indication area G5 may have a shape other than the rectangular shape (e.g., an oval shape or the like).

Further, in first and second embodiments described above, the case has been described in which the camera area G2 and the hand areas G3 (the hand area G3a, the hand area G3b, and the hand area G3c) are displayed in the area in the vicinity of the lower end of the screen gr of the monitor 24. However, the invention is not limited thereto. For example, in a modification, the camera area G2 and the hand areas G3 (the hand area G3a, the hand area G3b, and the hand area G3c) may be displayed in an area in the vicinity of the upper end eu of the screen gr of the monitor 24. Specifically, the camera area G2 and the hand areas G3 may be displayed between the upper end eu of the screen gr and a position blow the upper end eu of the screen gr by the length (L11) of one tenth of the vertical length of the screen gr.

Further, in first and second embodiments described above, the case has been described in which, when two or more of the medical instruments 4 are located outside the field of view of the endoscope 6, two or more marks MK1 corresponding to the two or more of the medical instruments 4 are displayed in the arrangement order of the arms 60 that supports the two or more of the medical instruments 4. However, the invention is not limited thereto. For example, in a modification, the order of the positions of the marks MK1 displayed may be different from the order of the physical positions of the arms 60 that support the medical instruments 4.

Further, in first and second embodiments described above, the case has been described in which, when one or two of the medical instruments 4 are located outside the field of view of the endoscope 6, the one or two marks MK1 corresponding to the one or two of the medical instruments 4 are displayed at the position shifted toward the center of the screen g. However, the invention is not limited thereto. For example, in a modification, in each area G12, a position of each of the marks MK1 corresponding to the medical instruments 4 may be fixed.

Further, in first and second embodiments described above, the case has been described in which the mark MK1 is displayed in different manners depending on whether the medical instrument 4 located outside the field of view is an operation target or not. However, the invention is not limited thereto. For example, in a modification, the mark MK1 may be displayed in the same manner regardless of whether the medical instrument 4 located outside the field of view is an operation target or not.

Figure 28:
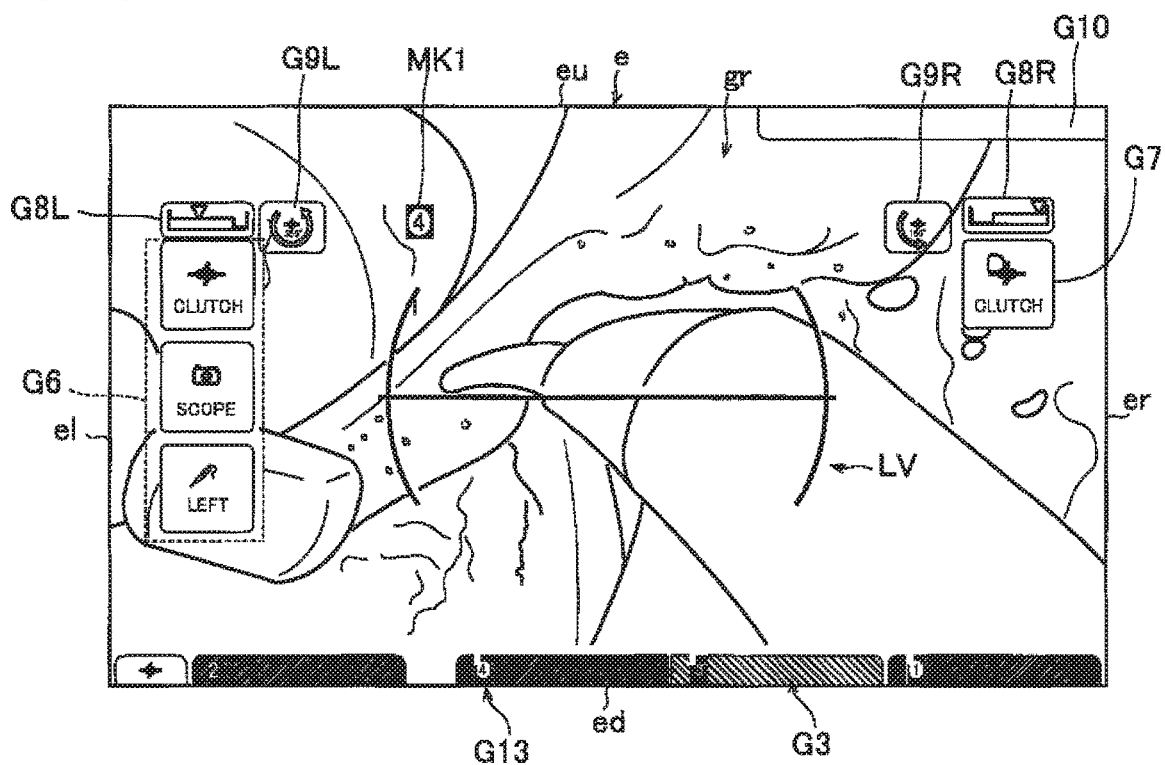
FIG. 28 is a diagram for explaining a graphical user interface including a mark on an image captured by an endoscope according to a first modification.
Figure 29A:
FIGS. 29A and 29B are diagrams for explaining examples of marks according to a first modification.
Figure 29B:

Further, in first and second embodiments described above, the case has been described in which the mark MK1 indicating the medical instrument 4 that is located outside the field of view of the endoscope 6 is displayed in the neighborhood area G11 in the vicinity of the outer edge of the level indication area G5. However, the invention is not limited thereto. For example, in a modification, as illustrated in FIGS. 28, 29A and 29B, in addition to the neighborhood area G11, a portion (e.g. a left end portion) of each of the hand areas G3a, G3b and G3c may include divided eight sections G13 (see FIG. 29A), and one of the eight sections G13 may be highlighted in a color (e.g., white) different from the rest of the eight sections G13 (see FIG. 29B), to indicate the position of the medical instrument 4 that is located outside the field of view of the endoscope 6.

Figure 30:
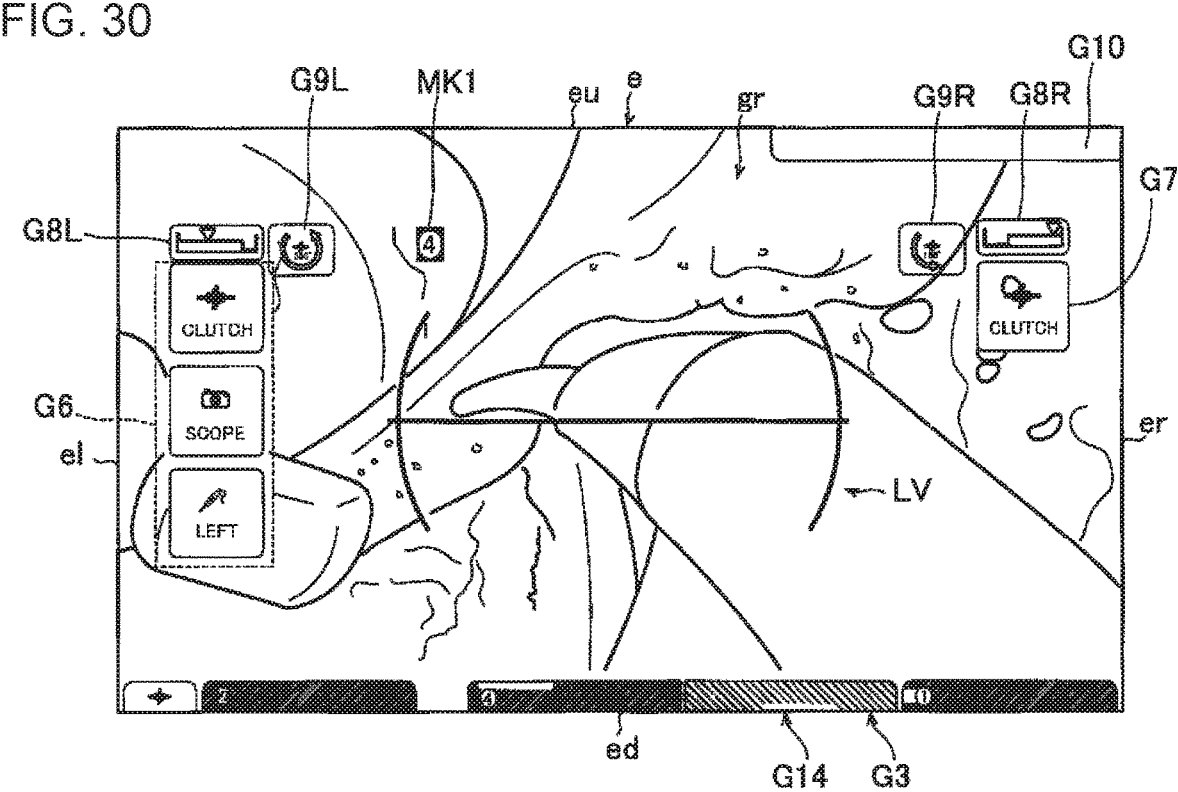
FIG. 30 is a diagram for explaining a graphical user interface including a mark on an image captured by an endoscope according to a second modification.
Figure 31:
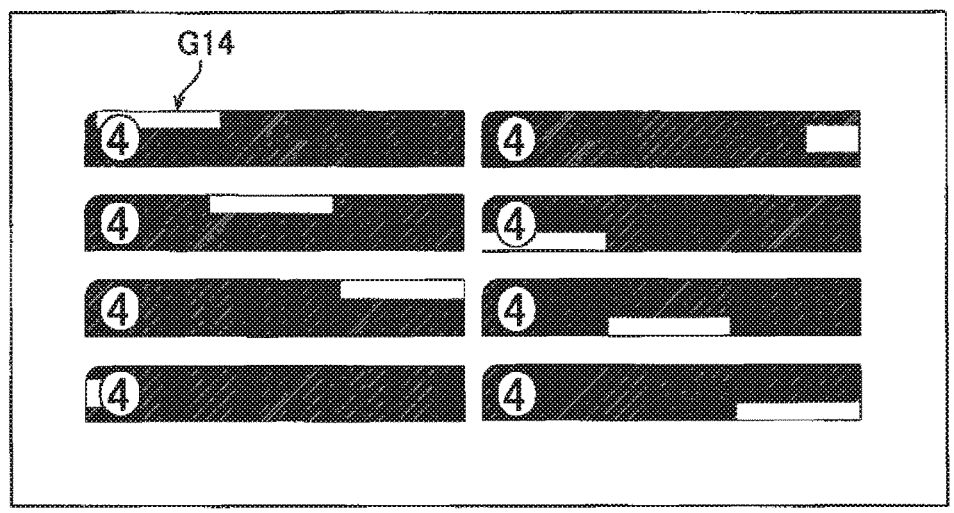
FIG. 31 is a diagram for explaining examples of marks according to a second modification.

Further, in first and second embodiments described above, the mark MK1 indicating the medical instrument 4 that is located outside the field of view of the endoscope 6 is displayed in the neighborhood area G1 in the vicinity of the outer edge of the level indication area G5. However, the invention is not limited thereto. For example, in a modification, as illustrated in FIGS. 30 and 31, in addition to the neighborhood area G11, an outer circumferential portion of each of the hand areas G3a, G3b, and G3c may be divided into eight sections G14, and one of the eight sections G14 may be highlighted in a color (e.g., white) different from the rest of the eight sections G14, to indicate the position of the medical instrument 4 that is located outside the field of view of the endoscope 6.

Further, in first and second embodiments described above, the case has been described in which the number of the arms 60 provided is four. However, the invention is not limited thereto. In a modification, the number of the arms 60 may be any number as long as at least one is provided.

Further, in first and second embodiments described above, the case has been described in which each of the arm portion 61 and the positioner 40 are configured as the 7-axis articulated robot. However, the invention is not limited thereto. For example, each of the arm portion 61 and the positioner 40 may be configured as an articulated robot other than the 7-axis articulated robot (for example, a 6-axis articulated robot, an 8-axis articulated robot, or the like).

Further, in first and second embodiments described above, the case has been described in which the medical manipulator 1 includes the medical trolley 3, the positioner 40, and the arm base 50. However, the invention is not limited thereto. For example, the medical manipulator 1 may include only the arms 60 and not include the medical trolley 3, the positioner 40, or the arm base 50.

Figure 32:
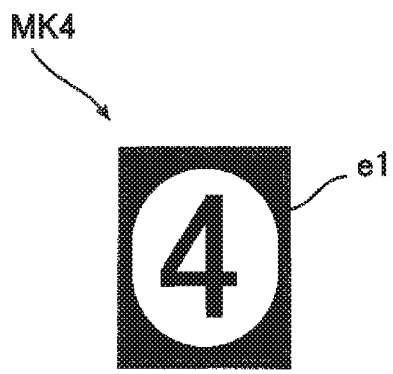
FIG. 32 is a diagram for explaining an example of a mark according to a third modification.
Figure 33A:
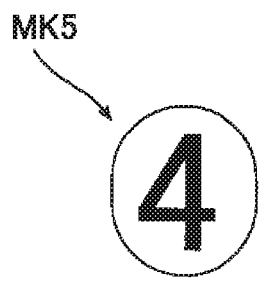
FIGS. 33A and 33B are diagrams for explaining examples of marks according to a fourth modification.
Figure 33B:
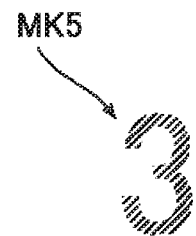

Further, in a first embodiment described above, the case has been described in which each of the identification numbers (1 to 4) of the arms 60 is displayed in the black squire. However, the invention is not limited thereto. For example, in a modification, a mark MK4 such as being illustrated in FIG. 32 may include the outer edge el of the black squire surrounded by another color (such as, red, or the like). Furthermore, in a modification, a mark MK5 such as being illustrated in FIG. 33A may be displayed having the identification number of the arm 60 in the white oval without the black square (e.g., when the medical instrument 4 is an operation target), or a mark MK5 such as being illustrated in FIG. 33B may be displayed having the gray-colored identification number of the arm 60 without the black squire and the white oval (e.g., when the medical instrument is a non-operation target).

Further, in a second embodiment described above, the case has been described in which the arrow MK2*a* is two-dimensionally displayed. However, the invention is not limited thereto. For example, the arrow MK2*a* may be three-dimensionally displayed. With this configuration, it is possible for the operator to distinguish between (recognize) a state where the medical instrument 4 that is located outside the field of view of the endoscope 6 is located closer to the operator and a state where the medical instrument 4 that is located outside the field of view of the endoscope 6 is located further from the operator.

Further, in first and second embodiments described above, the case has been described in which the level indication area G5 in which the level LV is displayed serves as a center area according to the invention. However, the invention is not limited thereto. In a modification, an area other than the level indication area G5 may serve as the center area.

The functions of each of the elements disclosed herein may be carried out by a circuit or a processing circuit including a general purpose processor, a dedicated processor, an integrated circuit, an ASIC (Application Special Integrated Circuit), a conventional circuit, or a combination of two or more of them, that is configured or programmed to perform the functions. A processor is considered a processing circuit or a circuit because it contains transistors and other circuit elements. In the disclosure, a circuit, a unit, or a means may be either a hardware that is configured to perform the recited function(s) or a hardware that is programmed to perform the recited function(s). The hardware may be the hardware disclosed herein, or may be other known hardware that is programmed or configured to perform the function(s) described. If the hardware is a processor which is considered as a type of a circuit, a circuit, a means, or a unit is a combination of hardware and software, and the software is used to configure the hardware and/or the processor.

The invention includes other embodiments or modifications in addition to one or more embodiments and modifications described above without departing from the spirit of the invention. The one or more embodiments and modifications described herein are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:

1. A robotic surgical system, comprising:
   manipulators that respectively support an endoscope and surgical instruments;
   a remote control apparatus that includes a display device configured to display an endoscopic image captured by the endoscope, operation handles configured to operate the surgical instruments, respectively, and an operation pedal configured to execute a function of at least one of the surgical instruments; and
   a control device configured to generate a graphical user interface and display, on the display device, the graphical user interface on the endoscopic image in an overlapped manner, wherein
   the graphical user interface includes: a rectangular center area that includes a center of a screen of the display device; a rectangular inner frame area that surrounds and is in contact with the center area of the graphical user interface; and a rectangular outer frame area that surrounds and is in contact with the inner frame area and is in contact with an edge of the screen of the display device,
   the outer frame area of the graphical user interface includes: a surgical instrument usage information area to indicate usage information of the surgical instruments; an operation pedal area that is displayed when the operation pedal is operated; and a surgical system area to indicate a state of the robotic surgical system,
   a length of a left side portion of the outer frame area in a horizontal direction is greater than a length of a left side portion of the inner frame area in the horizontal direction, and a length of a right side portion of the outer frame area in the horizontal direction is greater than a length of a right side portion of the inner frame area in the horizontal direction,
   the control device is configured to display, in response to receiving a command that enables the endoscope to move and determining that an entirety of at least one of the surgical instruments is located outside a field of view of the endoscope, a level indication of the endoscope in the center area of the graphical user interface and a mark that corresponds to the at least one of the surgical instruments the entirety of which is determined to be located outside the field of view of the endoscope, the mark being displayed within the inner frame area outside the center area of the graphical user interface, the level indication and the mark being superimposed on the endoscopic image such that the mark is displayed in the inner frame area located outside the center area displaying the level indication with a center of the displayed level indication being aligned with the center of the screen.

2. The robotic surgical system according to claim 1, wherein
   the mark is displayed at a position displaced from a center of the center area in a direction in which the surgical instrument the entirety of which is located outside the field of view of the endoscope is displaced from the field of view of the endoscope.

3. The robotic surgical system according to claim 1, wherein
   the mark is displayed in one of areas into which the inner frame area is divided by lines radially spread from a center of the center area.

4. The robotic surgical system according to claim 1, wherein the mark is arranged between the center area and at least one of the surgical instrument usage information area, the operation pedal area, and the surgical system area.

5. The robotic surgical system according to claim 1, wherein
the center area is in the rectangular shape having an upper edge, a left edge, a right edge, and a lower edge thereof,
the upper edge of the center area is provided between a position upper from the center of the screen by a length of one tenth of a vertical length of the screen and a position lower from an upper end of the screen by the length of one tenth of the vertical length of the screen,
the left edge of the center area is provided between a position left from the center of the screen by a length of one tenth of a horizontal length of the screen and a position right from a left end of the screen by the length of one tenth of the horizontal length of the screen,
the right edge of the center area is provided between a position right from the center of the screen by the length of one tenth of the horizontal length of the screen and a position left from a right end of the screen by the length of one tenth of the horizontal length of the screen, and
the lower edge of the center area is provided between a position lower from the center of the screen by the length of one tenth of the vertical length of the screen and a position upper from a lower end of the screen by the length of one tenth of the vertical length of the screen.

6. The robotic surgical system according to claim 5, wherein
the upper edge of the center area is provided between a position upper from the center of the screen by a length of one eighth of the vertical length of the screen and a position lower from the upper end of the screen by the length of one eighth of the vertical length of the screen,
the left edge of the center area is provided between a position left from the center of the screen by a length of one eighth of the horizontal length of the screen and a position right from the left end of the screen by the length of one eighth of the horizontal length of the screen,
the right edge of the center area is provided between a position right from the center of the screen by the length of one eighth of the horizontal length of the screen and a position left from the right end of the screen by the length of one eighth of the horizontal length of the screen, and
the lower edge of the center area is provided between a position lower from the center of the screen by the length of one eighth of the vertical length of the screen and a position upper from the lower end of the screen by the length of one eighth of the vertical length of the screen.

7. The robotic surgical system according to claim 1, wherein
the surgical instruments comprise first and second surgical instruments that are operation targets to be operated by the operation handles, and a third surgical instrument for replacement that is replaceable with either of the first surgical instrument or the second surgical instrument so as to be an operation target to be operated by the operation handles, and
the graphical user interface displays, at an area in a vicinity of an upper end or a lower end of the screen within the outer frame area, a first area that displays information on the first surgical instrument, a second area that displays information on the third surgical instrument, a third area that displays information on the second surgical instrument, and a fourth area that displays information on the endoscope.

8. The robotic surgical system according to claim 7, wherein
the first, second, and third areas are arranged in the area in the vicinity of the lower end of the screen within the outer frame area,
the center area is in a rectangular shape having an upper edge, a left edge, a right edge, and lower edge thereof, and
the lower edge of the rectangular center area is arranged upper than the first, second, and third areas.

9. The robotic surgical system according to claim 1, wherein
the control device is configured, when entireties of two or more of the surgical instruments are located outside the field of view of the endoscope, to display the mark corresponding to each of the two or more of the surgical instruments.

10. The robotic surgical system according to claim 1, wherein
the control device is configured to switch between a mode in which the mark is displayable and a mode in which the mark is not displayable.

11. The robotic surgical system according to claim 1, wherein
the remote control apparatus includes an input device configured to input a command that enables the movement of the endoscope,
the operation handles includes a first operation handle and a second operation handle, and
when the command that enables movements of the endoscope is inputted through the input device, the endoscope is configured to be moved according to operation of both of the first and second operation handles together.

12. The robotic surgical system according to claim 1, wherein
the control device is configured to display the mark in a different manner depending on whether the surgical instrument the entirety of which is located outside the field of view of the endoscope is an operation target or not.

13. The robotic surgical system according to claim 1, wherein
the mark includes an identification number that identifies the manipulator that supports the surgical instrument the entirety of which is located outside the field of view of the endoscope.

14. The robotic surgical system according to claim 1, wherein
the mark further includes an arrow that indicates a direction in which the surgical instrument the entirety of which is located outside the field of view of the endoscope is deviated from the field of view of the endoscope.

15. The robotic surgical system according to claim 1, wherein
the displayed level indication includes a center line such that the displayed center line of the level indication is overlapped with the center of the screen.

16. The robotic surgical system according to claim 1, wherein
the operation pedal comprises operation pedals configured to execute functions of the surgical instruments, the operation pedal area comprises: a left pop-up area which is provided in the left side portion of the outer frame area and in which a first icon pops up when a first operation pedal of the operation pedals is operated; and a right pop-up area which is provided in the right side portion of the outer frame area and in which a second icon pops up when a second operation pedal of the operation pedals is operated.

17. A robotic surgical system, comprising:
manipulators that respectively support an endoscope and surgical instruments;
a remote control apparatus that includes a display device configured to display an endoscopic image captured by the endoscope, a first operation handle to operate a first surgical instrument among the surgical instruments, a second operation handle to operate a second surgical instrument among the surgical instruments, and an operation pedal including an endoscope pedal configured, when being operated, to enable the endoscope to move according to operation of both of the first operation handle and the second operation handle together; and
a control device configured to generate a graphical user interface and display, on the display device, the graphical user interface on the endoscopic image in an overlapped manner, wherein
the graphical user interface includes: a rectangular center area that includes a center of a screen of the display device; a rectangular inner frame area that surrounds and is in contact with the center area of the graphical user interface; and a rectangular outer frame area that surrounds and is in contact with the inner frame area and is in contact with an edge of the screen of the display device,
the outer frame area of the graphical user interface includes: a surgical instrument usage information area to indicate usage information of the surgical instruments; an operation pedal area that is displayed when the operation pedal is operated; and a surgical system area to indicate a state of the robotic surgical system,
a length of a left side portion of the outer frame area in a horizontal direction is greater than a length of a left side portion of the inner frame area in the horizontal direction, and a length of a right side portion of the outer frame area in the horizontal direction is greater than a length of a right side portion of the inner frame area in the horizontal direction,
the control device is configured to display, in response to determining that the endoscope pedal is operated and that an entirety of at least one of the surgical instruments is located outside a field of view of the endoscope, a level indication of the endoscope in the center area of the graphical user interface and a mark that corresponds to the at least one of the surgical instruments the entirety of which is determined to be located outside the field of view of the endoscope in, the mark being displayed within the inner frame area outside the center area of the graphical user interface, the level indication and the mark being superimposed on the endoscopic image such that the mark is displayed in the inner frame area outside the center area displaying the level indication with a center of the displayed level indication being aligned with a center of a screen of the display device.

18. A display method performed by a controller of a robotic surgical system, wherein the robotic surgical system includes: manipulators that respectively support an endoscope and surgical instruments; a remote control apparatus that includes a display device configured to display an endoscopic image captured by the endoscope, operation handles to respectively operate the surgical instruments, and an operation pedal configured to execute a function of at least one of the surgical instruments; and the controller, the display method comprising:
acquiring the endoscopic image captured by the endoscope;
generating a graphical user interface and displaying, on the display device, the graphical user interface on the endoscopic image in an overlapped manner, wherein the graphical user interface includes: a rectangular center area that includes a center of a screen of the display device; a rectangular inner frame area that surrounds and is in contact with the center area of the graphical user interface; and a rectangular outer frame area that surrounds and is in contact with the inner frame area and is in contact with an edge of the screen of the display device, the outer frame area of the graphical user interface includes: a surgical instrument usage information area to indicate usage information of the surgical instruments; an operation pedal area that is displayed when the operation pedal is operated; and a surgical system area to indicate a state of the robotic surgical system, a length of a left side portion of the outer frame area in a horizontal direction is greater than a length of a left side portion of the inner frame area in the horizontal direction, and a length of a right side portion of the outer frame area in the horizontal direction is greater than a length of a right side portion of the inner frame area in the horizontal direction; and
in response to receiving a command that enables the endoscope to move and determining that an entirety of at least one of the surgical instruments is located outside a field of view of the endoscope, displaying a level indication of the endoscope in a center area of the graphical user interface and displaying a mark corresponding the at least one of the surgical instruments the entirety of which is determined to be located outside the field of view of the endoscope, the mark being displayed within the inner frame area outside the center area of the graphical user interface, the level indication and the mark being superimposed on the endoscopic image such that the mark is displayed in the the inner frame area outside the center area displaying the level indication with a center of the displayed level indication being aligned with the center of the screen.

19. The display method according to claim 18, wherein the mark is displayed at a position displaced from a center of the center area in a direction in which the surgical instrument the entirety of which is located outside the field of view of the endoscope is displaced from the field of view of the endoscope.

20. The display method according to claim 18, wherein the center area is in the rectangular shape having an upper edge, a left edge, a right edge, and lower edge thereof,
the upper edge of the center area is provided between a position upper from the center of the screen by a length of one tenth of a vertical length of the screen and a position lower from an upper end of the screen by the length of one tenth of the vertical length of the screen,
the left edge of the center area is provided between a position left from the center of the screen by a length of one tenth of a horizontal length of the screen and a position right from the left end of the screen by the length of one tenth of the horizontal length of the screen, the right edge of the center area is provided between a position right from the center of the screen by the length of one tenth of the horizontal length of the screen and a position left from a right end of the screen by the length of one tenth of the horizontal length of the screen, and the lower edge of the center area is provided between a position lower from the center of the screen by the length of one tenth of the vertical length of the screen and a position upper from a lower end of the screen by the length of one tenth of the vertical length of the screen.

* * * * *